US010709968B2

(12) United States Patent
Huang

(10) Patent No.: US 10,709,968 B2
(45) Date of Patent: *Jul. 14, 2020

(54) CONTROLLER HAVING LIGHTS DISPOSED ALONG A LOOP OF THE CONTROLLER

(71) Applicant: Sony Interactive Entertainment Inc., Tokyo (JP)

(72) Inventor: Ennin Huang, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/027,213

(22) Filed: Jul. 3, 2018

(65) Prior Publication Data
US 2018/0311571 A1 Nov. 1, 2018

Related U.S. Application Data

(63) Continuation of application No. 14/976,907, filed on Dec. 21, 2015, now Pat. No. 10,010,788.

(51) Int. Cl.
G06F 17/00 (2019.01)
A63F 13/213 (2014.01)
A63F 13/24 (2014.01)
A63F 13/26 (2014.01)
G06F 3/01 (2006.01)
G06F 3/03 (2006.01)
G06F 3/0346 (2013.01)

(52) U.S. Cl.
CPC ............ A63F 13/213 (2014.09); A63F 13/24 (2014.09); A63F 13/26 (2014.09); G06F 3/011 (2013.01); G06F 3/012 (2013.01); G06F 3/0308 (2013.01); G06F 3/0346 (2013.01); A63F 2250/497 (2013.01); A63F 2300/8082 (2013.01)

(58) Field of Classification Search
None
See application file for complete search history.

(56) References Cited

U.S. PATENT DOCUMENTS

| D660,360 S | * | 5/2012 | Richter | .......................... D20/10 |
| 2001/0026264 A1 | * | 10/2001 | Rosenberg | .............. A63F 13/06 345/156 |
| 2003/0195045 A1 | * | 10/2003 | Kaminkow | ......... G07F 17/3211 463/47 |
| 2007/0021208 A1 | * | 1/2007 | Mao | ........................ G06F 3/017 463/36 |
| 2007/0052177 A1 | * | 3/2007 | Ikeda | ...................... A63F 13/24 273/317 |
| 2007/0060336 A1 | * | 3/2007 | Marks | ..................... A63F 13/02 463/30 |
| 2008/0261693 A1 | * | 10/2008 | Zalewski | .............. G06F 3/0304 463/31 |

(Continued)

Primary Examiner — Paul A D'Agostino
(74) Attorney, Agent, or Firm — Penilla IP, APC

(57) ABSTRACT

A controller for use in interfacing with a virtual reality system is provided. The controller having a body with a proximate end and a distal end, and the distal end is opposite the proximate end. A handgrip portion of the body is disposed at the proximate end of the body. An extension portion of the body is coupled at the distal end of the body. The extension portion has a loop shape. A plurality of lights is disposed on surfaces of the extension portion, such that lights illuminate on an inside of the loop shape and on an outside of the loop shape.

20 Claims, 21 Drawing Sheets

(56) References Cited

U.S. PATENT DOCUMENTS

| | | | |
|---|---|---|---|
| 2008/0319252 A1* | 12/2008 | Chapman | A61M 21/02 600/27 |
| 2009/0149256 A1* | 6/2009 | Lui | A63F 13/02 463/37 |
| 2010/0033427 A1* | 2/2010 | Marks | H04N 13/10 345/156 |
| 2010/0105480 A1* | 4/2010 | Mikhailov | A63F 13/06 463/38 |
| 2010/0184513 A1* | 7/2010 | Mukasa | A63F 13/00 463/37 |
| 2010/0201808 A1* | 8/2010 | Hsu | G06F 3/0325 348/135 |
| 2011/0012661 A1* | 1/2011 | Binder | A63F 9/24 327/276 |
| 2011/0159959 A1* | 6/2011 | Mallinson | A63F 13/235 463/37 |
| 2011/0294579 A1* | 12/2011 | Marks | H04N 13/10 463/36 |

\* cited by examiner

CONTROLLER HAVING LIGHTS DISPOSED ALONG A LOOP OF THE CONTROLLER

CLAIM OF PRIORITY

The present application is a Continuation of U.S. patent application Ser. No. 14/976,907, filed on Dec. 21, 2015, (U.S. patent Ser. No. 10/010,788, issued on Jul. 3, 2018), entitled "Game Controller With Lights Visible Inside and Outside the Game Controller", which is herein incorporated by reference.

FIELD OF DISCLOSURE

The present disclosure relates generally to controller devices for collecting user inputs from users of a computer system.

BACKGROUND

There many types of user input devices for user to provide input to a computer system must interact with one or more applications or games operating on the computer system. In many instances, one type of the inputs a user may provide to a computer system is a movement by the user or a part of the user such as the user's hand or foot.

It is in this context that the following embodiments arise.

SUMMARY

Broadly speaking, the present disclosure fills these needs by providing an internally and externally illuminated game controller that can be more easily tracked though more angles of movement. The device can be used for interfacing with video games providing input to user interface displays and/or providing input while using a head mounted display (HMD). It should be appreciated that the present disclosure can be implemented in numerous ways, including as a process, an apparatus, a system, computer readable media, or a device. Several inventive embodiments of the present disclosure are described below.

In one embodiment, a controller for use in interfacing with a virtual reality system is provided. The controller having a body with a proximate end and a distal end, and the distal end is opposite the proximate end. A handgrip portion of the body is disposed at the proximate end of the body. An extension portion of the body is coupled at the distal end of the body. The extension portion has a loop shape. A plurality of lights is disposed on surfaces of the extension portion, such that lights illuminate on an inside of the loop shape and on an outside of the loop shape.

One embodiment provides a system and a method of tracking a user input device such as a game controller. The system includes emitting light from multiple light sources disposed in the user input device. The multiple light sources have a known spacing relative to each other on the user input device and at least some of the multiple light sources are capable of emitting light through an inside surface and an outside surface of the user input device. The multiple light sources can define a plane of the user input device that can be used to track the movement, location and orientation of the user input device. The user device is tracked using image data from a camera. The image data is communicated to a computer where the image data is processed to identify the movement, location and orientation of the user input device.

Another embodiment includes a user input device including a body including a proximate end and a distal end, the distal end being opposite from the proximate end. The user input device also includes a first extension portion and a second extension portion extending from the distal end of the body. The first extension portion includes a first inside surface, a first outside surface, the first inside surface being opposite from the first outside surface and a first light source disposed in the first extension portion, the first light source capable of emitting light through the first inside surface and the first outside surface. The second extension portion includes a second inside surface, a second outside surface, the second inside surface being opposite from the second outside surface and a second light source disposed in the second extension portion, the second light source capable of emitting light through the second inside surface and the second outside surface. A central light source can be disposed in the distal end, between the first extension portion and the second extension portion. The input device can also include a communication module in data communication with a computer system, the communication module is electrically coupled to the first light source, the second light source and the central light source and capable of individually modulating light emitted from each one of the first light source, the second light source or the central light source.

Another embodiment provides a method of providing user input to a computer system. The method includes tracking a user input device including emitting light from each of the first light source, the second light source and the central light source, capturing an image of the first light source, the second light source and the central light source using a camera coupled to a computer system, identifying a location and orientation of the user input device from a roll angle, a yaw angle and a pitch angle of the user input device, communicating the identified location and orientation of the user input device to a computer executing an application and adjusting at least one aspect of the application corresponding to the identified location and orientation of the user input device.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several exemplary embodiments for an internally and externally illuminated game controller will now be described. It will be apparent to those skilled in the art that the present disclosure may be practiced without some or all of the specific details set forth herein.

The present disclosure includes a game controller that has at least three light sources that are separated by a known relationship to one another on the game controller and that can be tracked by a video camera coupled to a gaming computer. The light sources can shine through both sides of portions of the game controller so that the video camera can more easily track the location and orientation of the game controller as the game controller is moved around by the user.

In one configuration, the front or top side of the controller can have a loop. The loop includes an open space within the loop. In one example, some of the light sources are disposed one surface of the loop and the light sources are able to illuminate both sides of the loop, or structure that defines the loop. Additional examples of the input device, e.g., controller, are provided with reference to FIGS. 4A through 14L below.

Figure 1:
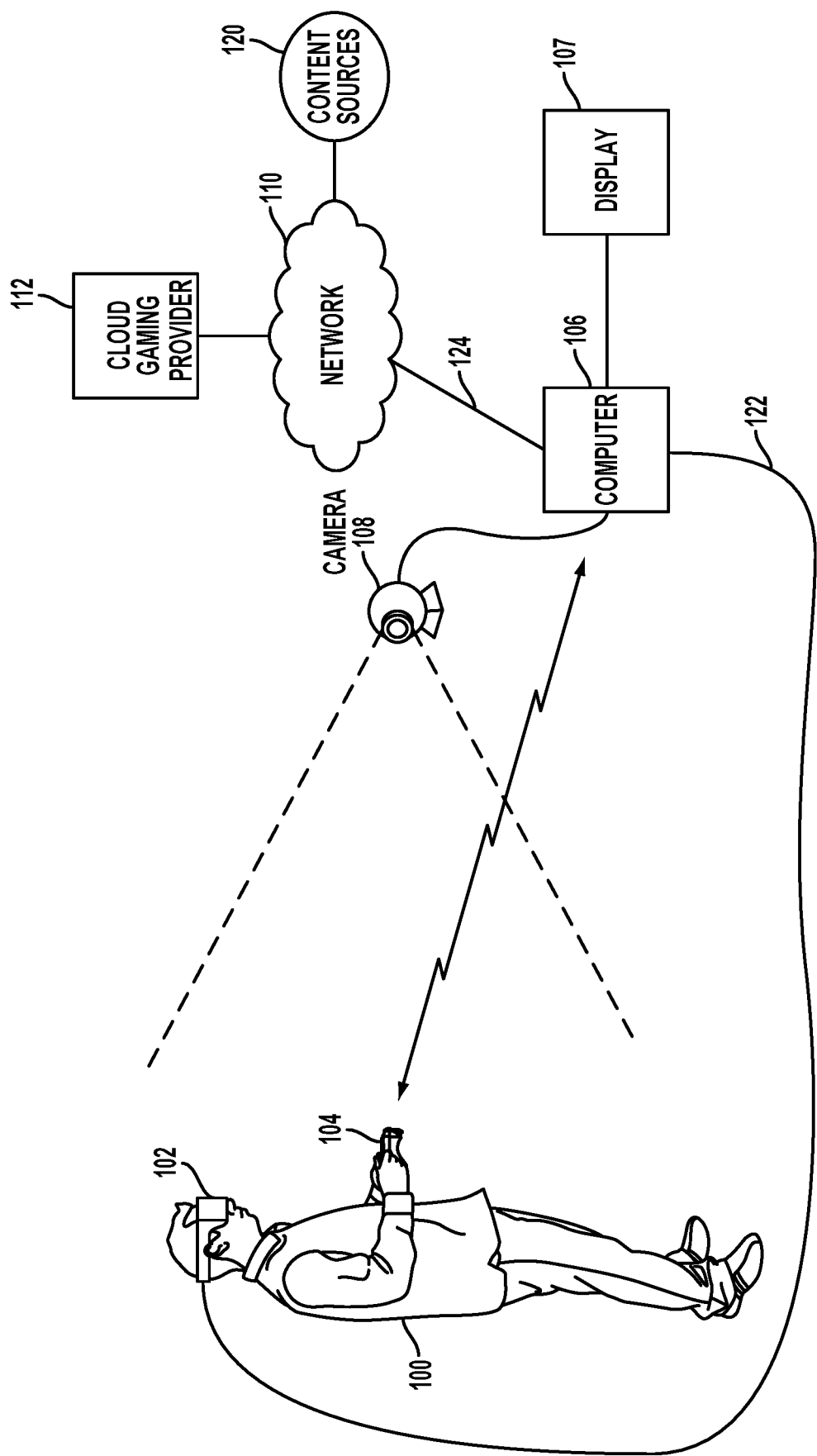
FIG. 1 illustrates a system for interactive gameplay of a video game, in accordance with the disclosed embodiments.

FIG. 1 illustrates a system for interactive gameplay of a video game, in accordance with the disclosed embodiments. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms (e.g., optics and display screens) in close proximity to the user's eyes and the format of the content delivered to the HMD. In one example, the HMD 102 may provide display regions to each of the user's eyes which occupy large portions or even the entirety of the field of view of the user. The HMD screen can have a refresh rate of about 30 to about 500 frames per second (Hz). In one implementation, the HMD screen can have a selectable refresh rate of about 60 or about 120 Hz.

In one embodiment, the HMD 102 may be connected to a computer 106. The connection 122 to computer 106 may be wired or wireless. The computer 106 may be any general or special purpose computer, including but not limited to, a gaming console, personal computer, laptop, tablet computer, mobile device, cellular phone, tablet, thin client, set-top box, media streaming device, etc. In some embodiments, the HMD 102 may connect directly to a network 110 such as the internet, which may allow for cloud gaming without the need for a separate local computer. In one embodiment, the computer 106 may be configured to execute a video game (and other digital content), and output the video and audio from the video game for rendering by the HMD 102. The computer 106 is also referred to herein as a client system 106, which in one example is a video game console.

The computer 106 may, in some embodiments, be a local or remote computer, and the computer may run emulation software. In a cloud gaming embodiment, the computer 106 is remote and may be represented by multiple computing services that may be virtualized in data centers, wherein game systems/logic may be virtualized and distributed to user over a network 110.

The user 100 may operate a controller 104 to provide input for the video game. In one example, a camera 108 may be configured to capture image of the interactive environment in which the user 100 is located. These captured images may be analyzed to determine the location and movements of the user 100, the HMD 102, and the controller 104. In one embodiment, the controller 104 includes a light (or lights) which may be tracked to determine its position/location and pose. Additionally, as described in further detail below, the HMD 102 may include one or more lights 200A-K which may be tracked as markers to determine the position and pose of the HMD 102 in substantial real-time during game play.

The camera 108 may include one or more microphones to capture sound from the interactive environment. Sound captured by a microphone array may be processed to identify the location of a sound source. Sound from an identified location may be selectively utilized or processed to the exclusion of other sounds not from the identified location. Furthermore, the camera 108 may be defined to include multiple image capture devices (e.g. stereoscopic pair of cameras), an IR camera, a depth camera, and combinations thereof.

In some embodiments, computer 106 may execute games locally on the processing hardware of the computer 106. The games or content may be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and execute the video game being played by the user 100. The computer 106 transmits inputs from the HMD 102, the controller 104 and the camera 108, to the cloud gaming provider 112, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104 or other input devices, e.g., gloves, clothes, the HMD 102, or combinations of two or more thereof.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections 124 to the network by the HMD 102, controller 104, and camera 108 may be wired or wireless. In some embodiments, content executed on the HMD 102 or displayable on a display 107, may be obtained from any content source 120. Example content sources may include, for instance, internet websites that provide downloadable content and/or streaming content. In some examples, the content may include any type of multimedia content, such as movies, games, static/dynamic content, pictures, social media content, social media websites, etc.

As will be described below in more detail, a user 100 may be playing a game on the HMD 102, where such content is immersive 3D interactive content. The content on the HMD 102, while the player is playing, may be shared to a display 107. In one embodiment, the content shared to the display 107 may allow other users proximate to the user 100 or remote to watch along with the user's play. In still further embodiments, another user viewing the game play of user 100 on the display 107 may participate interactively with player 100. For example, a user viewing the game play on the display 107 may control characters in the game scene, provide feedback, provide social interaction, and/or provide comments (via text, via voice, via actions, via gestures, etc.,) which enables users that are not wearing the HMD 102 to socially interact with user 100, the game play, or content being rendered in the HMD 102.

Figure 2A:
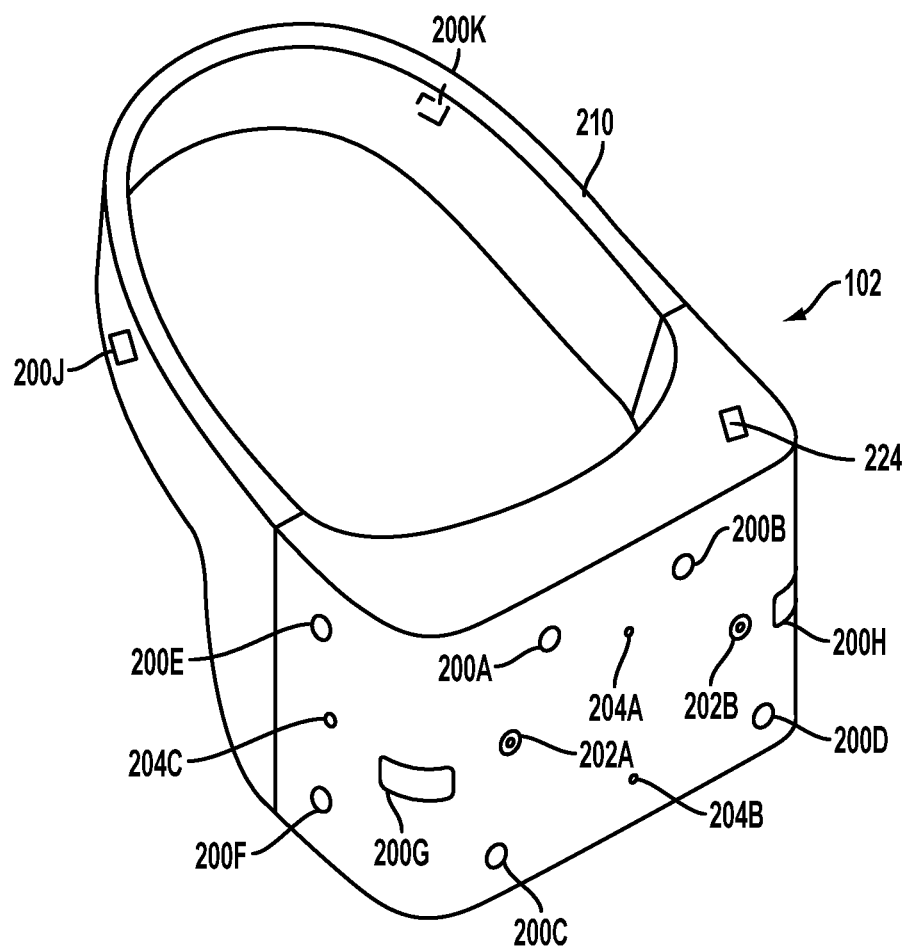
FIG. 2A illustrates a HMD, in accordance with the disclosed embodiments.

FIG. 2A illustrates a HMD 102, in accordance with the disclosed embodiments. As shown, the HMD 102 includes a plurality of lights 200A-K (e.g., where 200K and 200J are located toward the rear or backside of the HMD headband 210). Each of these lights may be configured to have specific shapes and/or positions, and may be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights may be identified in captured images of an interactive environment in which a user uses the HMD 102.

Based on identification and tracking of the lights, the position and pose of the HMD 102 in the interactive environment may be determined. It will further be appreciated that some of the lights 200A-K may or may not be visible depending upon the particular position and pose of the HMD 102 relative to an image capture device. Also, different portions of lights (e.g. lights 200G and 200H) may be exposed for image capture depending upon the position and pose of the HMD 102 relative to the image capture device. In some embodiments, inertial sensors are disposed in the HMD 102, which provide feedback regarding orientation, without the need for lights 200A-K. In some embodiments, the lights and inertial sensors work together, to enable mixing and selection of position/motion data.

In one embodiment, the lights may be configured to indicate a current status of the HMD 102 to others in the vicinity. For example, some or all of the lights 200A-K may be configured to have a certain color arrangement, intensity arrangement, be configured to blink, have a certain on/off configuration, or other arrangement indicating a current status of the HMD 102. By way of example, the lights 200A-K may be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights 200A-K might also be configured to indicate relative intensity levels of gameplay. For example, the intensity of lights 200A-K, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones 204A-C, sound from each of the microphones may be processed to determine the location of the sound's source. This information may be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment may be captured from the perspective of the HMD 102. Such video may be presented to the user to provide the user with a "video see-through" ability while wearing the HMD 102. That is, though the user cannot see through the HMD 102 in a strict sense, the video captured by the image capture devices 202A and 202B may nonetheless provide a functional equivalent of being able to see the environment external to the HMD 102 as if looking through the HMD 102.

Such video may be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras or a single camera may be installed on the HMD 102, and oriented in any direction. For example, in another embodiment, there may be cameras mounted on the sides of the HMD 102 to provide additional panoramic image capture of the environment. In one embodiment, front facing camera (RCG, and/or depth cameras) may be used to track position and pose, and motions of hands or gloves of the user. As will be described below, information from the image data captured by the front facing cameras can be used to provide finer resolution and otherwise improved haptic feedback to the user when interfacing with virtual objects.

Figure 2B:
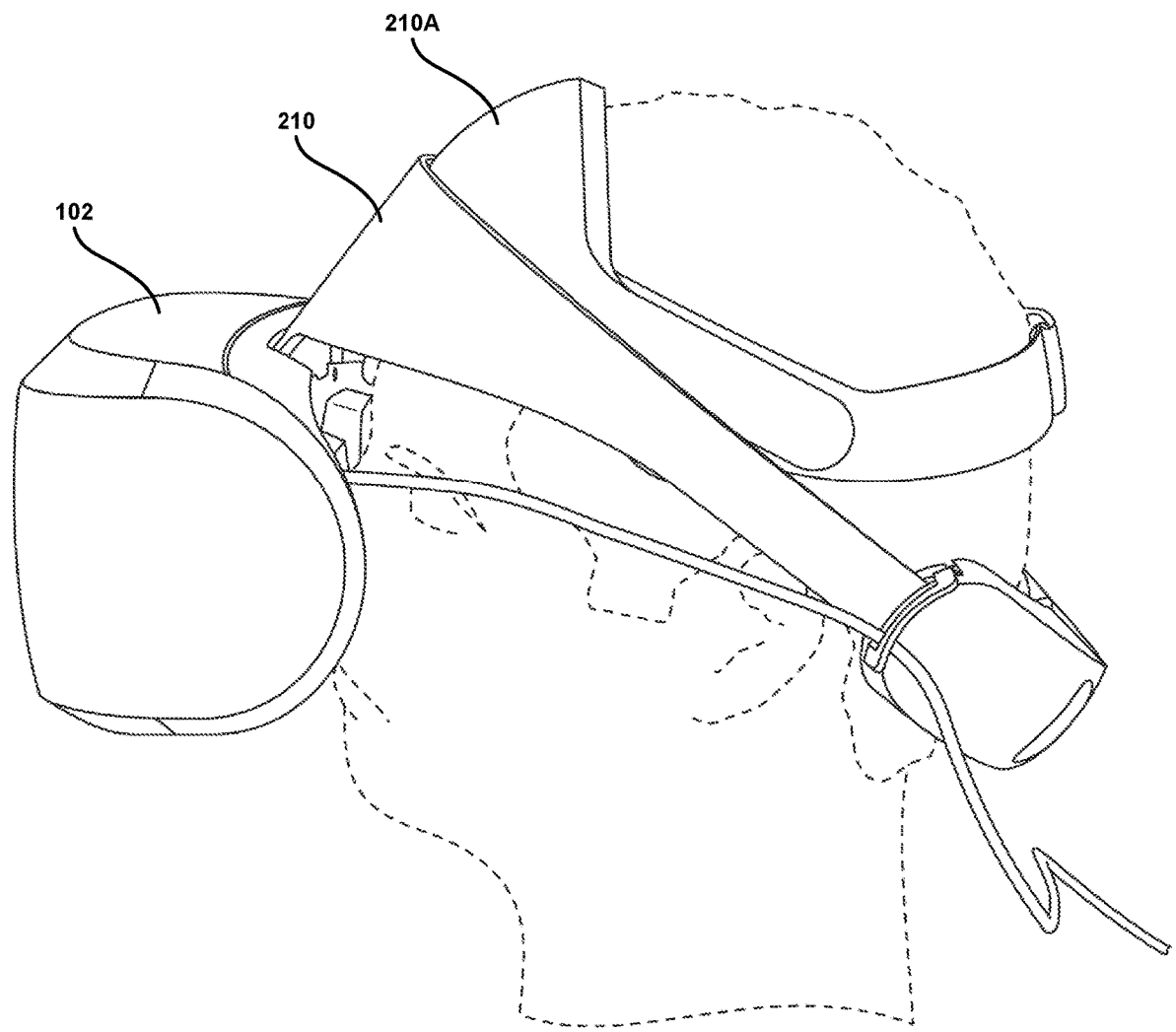
FIG. 2B shows a side view of a user wearing an HMD, for implementing embodiments of the present disclosure.
Figure 2C:
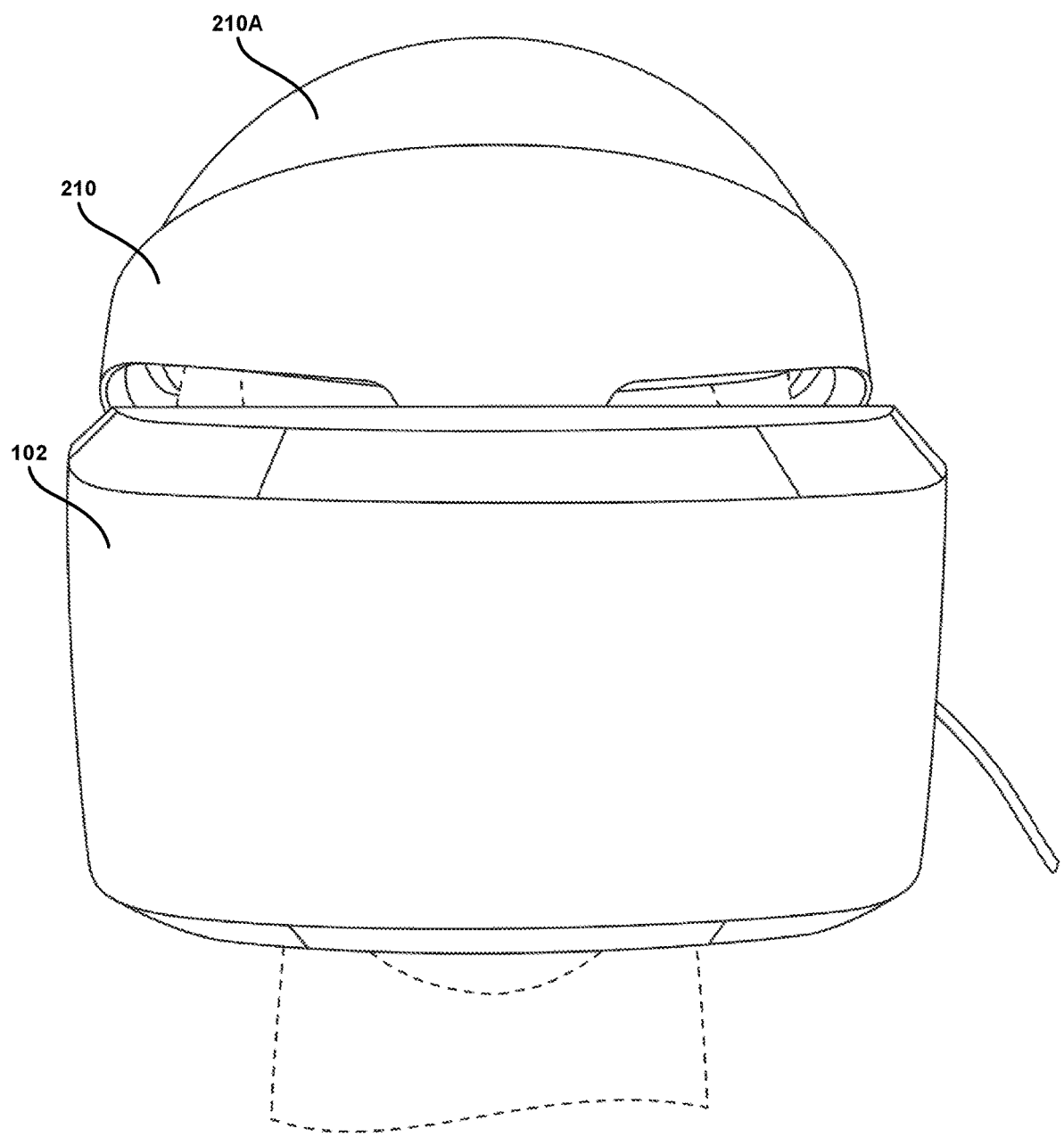
FIG. 2C shows a front view of a user wearing an HMD, for implementing embodiments of the present disclosure.

FIG. 2B shows a side view of a user wearing an HMD 102, for implementing embodiments of the present disclosure. FIG. 2C shows a front view of a user wearing an HMD 102, for implementing embodiments of the present disclosure. The HMD 102 is secured to the user's head via the headband 210 and/or a headband assembly 210A. The headband 210 and/or the headband assembly 210A are adjustable to comfortably fit the user and to position the HMD 102 in a comfortable position relative to the user's head and eyes as maybe desired by the user.

Figure 3:
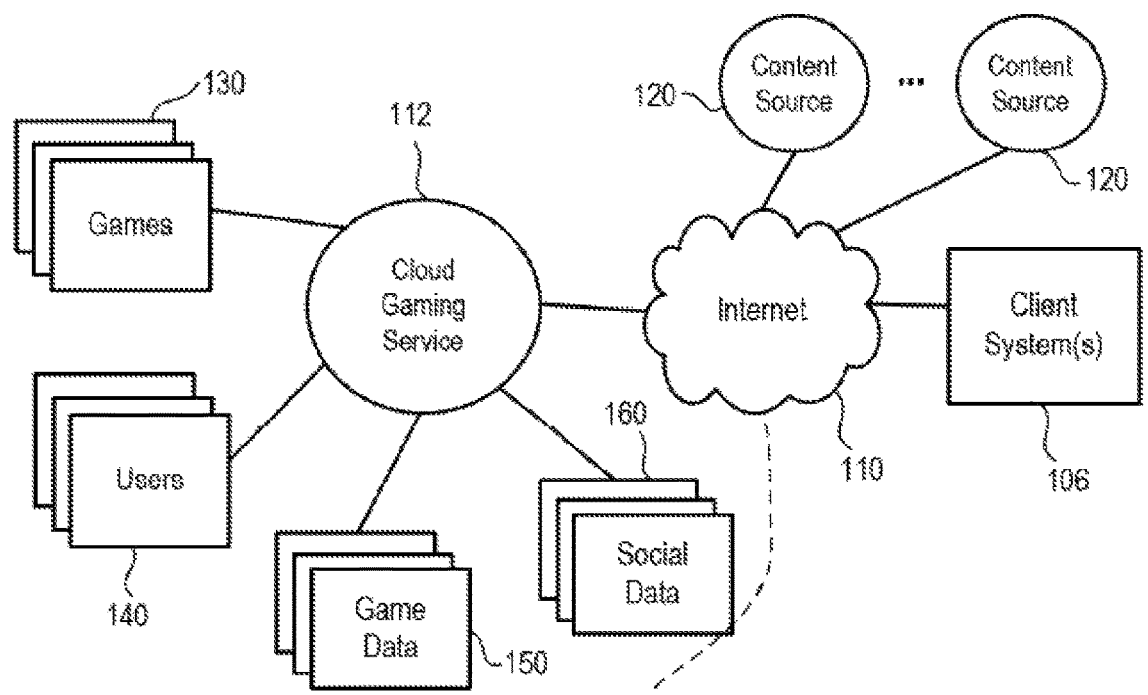
FIG. 3 illustrates one example of gameplay using the client system that is capable of rendering the video game content to the HMD of user, for implementing embodiments of the present disclosure.
Figure 3:
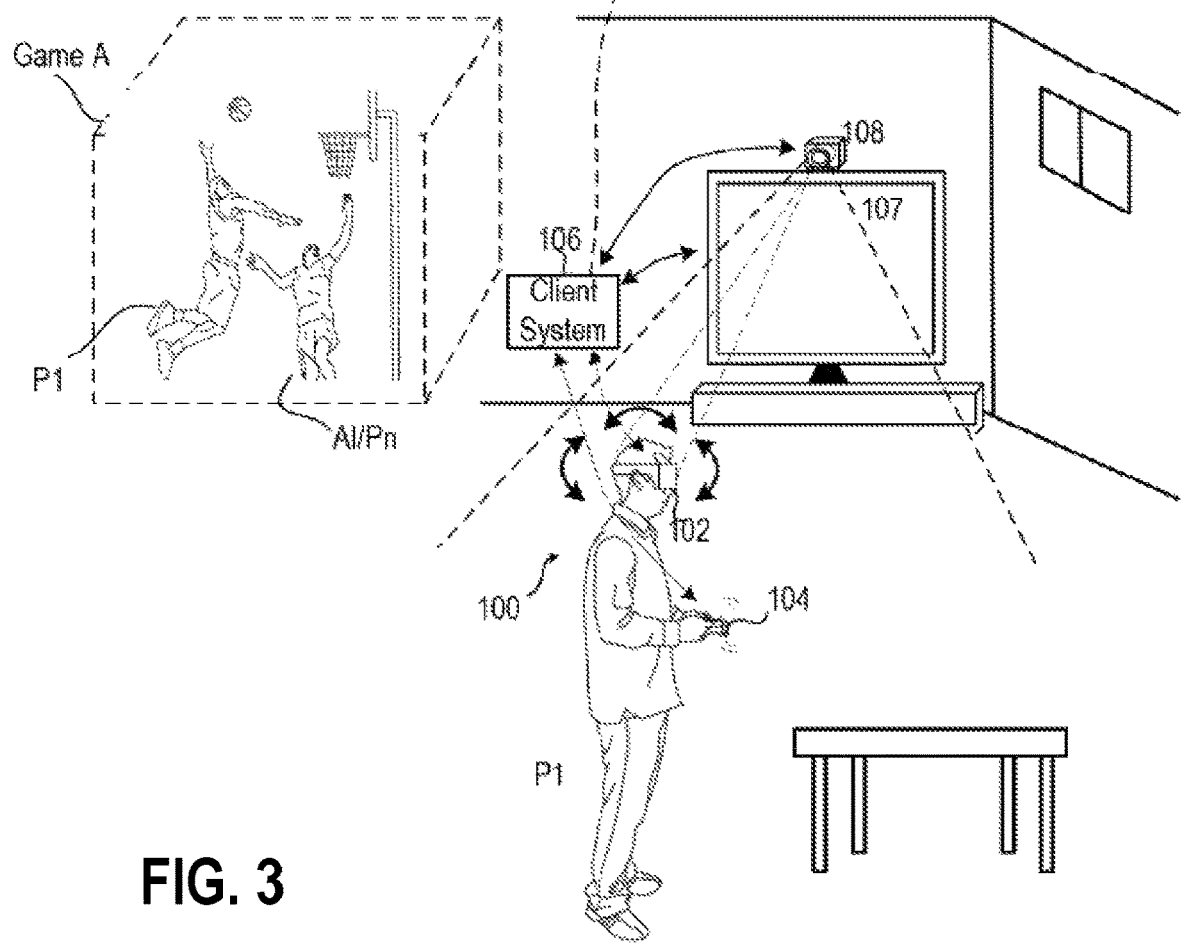

FIG. 3 illustrates one example of gameplay using the client system 106 that is capable of rendering the video game content to the HMD 102 of user 100, for implementing embodiments of the present disclosure. In this illustration, the game content provided to the HMD 102 is in a rich interactive 3-D space. As discussed above, the game content may be downloaded to the client system 106 or may be executed in one embodiment by a cloud processing system. Cloud gaming service 112 may include a database of users 140, which are allowed to access particular games, share experiences with other friends, post comments, and manage their account information.

The cloud gaming service 112 may also store game data 150 for specific users, which may be usable during gameplay, future gameplay, sharing to a social media network, or for storing trophies, awards, status, ranking, etc. Social data 160 may also be managed by cloud gaming service 112. The social data 160 may be managed by a separate social media network, which may be interfaced with cloud gaming service 112 over the Internet 110. Over the Internet 110, any number of client systems 106 may be connected for access to the content and interaction with other users.

Continuing with the example of FIG. 3A, the three-dimensional interactive scene viewed in the HMD 102 may include gameplay, such as the characters illustrated in the 3-D view. One character, e.g. P1, may be controlled by the user 100 that is wearing the HMD 102. This example shows a basketball scene between two players, wherein the HMD user 100 is dunking a ball on another character in the 3-D view. The other character may be an AI (artificial intelligence) character of the game, or may be controlled by another user or users (Pn). User 100, who is wearing the HMD 102 is shown moving about in a space of use, wherein the HMD may move around based on the user's head movements and body positions. The camera 108 is shown positioned over a display screen in the room, however, for HMD 102 use, the camera 108 may be placed in any location that may capture images of the HMD 102. As such, the user 100 is shown turned at about 90 degrees from the camera 108 and the display 107, as content rendered in the HMD 102 may be dependent on the direction that the HMD 102 is positioned, from the perspective of the camera 108. Of course, during HMD 102 use, the user 100 will be moving about, turning his head, looking in various directions, as may be needed to take advantage of the dynamic virtual scenes rendered by the HMD.

Figure 4A:
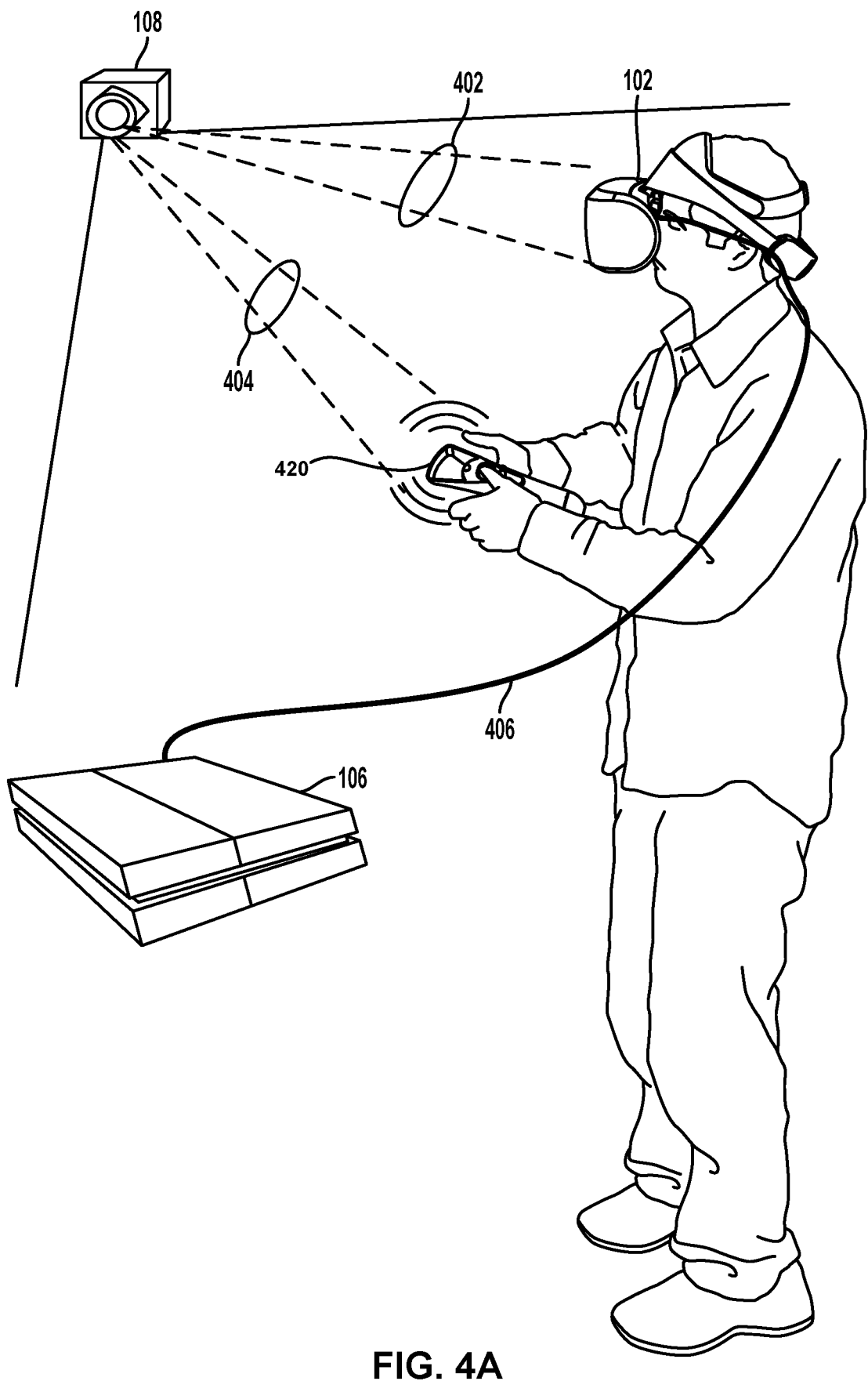
FIG. 4A illustrates a user wearing the HMD, during use, in accordance with the disclosed embodiments.

FIG. 4A illustrates a user wearing the HMD 102, during use, in accordance with the disclosed embodiments. In this example, it is shown that the HMD 102 is tracked 402 using an outside in tracking process where the camera 108 is tracking the HMD 102 location. The camera 108 is tracking the HMD 102 location using image data obtained from captured video frames by the camera 108. In other embodiments, tracking can also or alternatively utilize inertial data from the HMD itself. In various embodiments, tracking the user's head/HMD can include blended data obtained from image tracking and inertial tracking. Additionally, it is shown that the game controller 420 may also be tracked 404 using image data obtained from captured video frames by the camera 108.

Also shown is the configuration where the HMD 102 is connected to the computing system 106 via a cable 406. In one embodiment, the HMD 102 obtains power from the same cable or may connect to another cable. In still another embodiment, the HMD 102 may have a battery that is rechargeable, so as to avoid extra power cords. In still other embodiments, the user's hands can be tracked, with or without gloves.

Figure 4B:
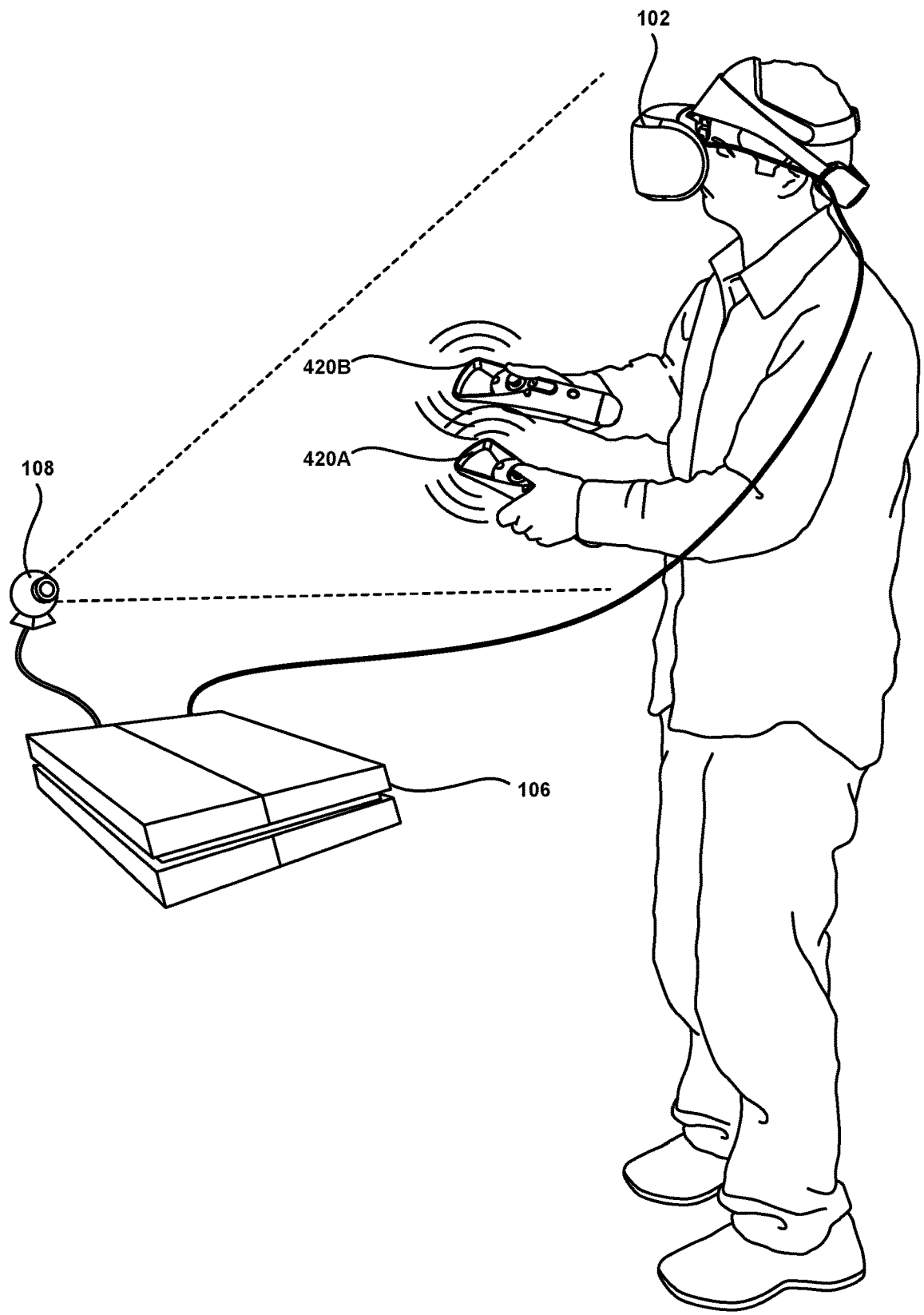
FIG. 4B shows user wearing an HMD and interacting with the gaming system with a pair game controllers, for implementing embodiments of the present disclosure.

As can be appreciated, there are a number of other application specific settings that are valuable, though not generic enough to be user settings. For instance, if the center of a user's gaze is used to activate an event, users may want to configure the radius/sensitivity of the target region. With these broad embodiments in mind, the following examples will illustrate ways to identify head tilt and ways to correct or adjust content to compensate for a specific user's head tilt to improve the user's HMD experience FIG. 4B shows user wearing an HMD and interacting with the gaming system with a pair game controllers 420A, 420B, for implementing embodiments of the present disclosure. As described in FIG. 4A above, the user can use one game controller 420 or two game controllers 420A, 420B as shown in FIG. 4B. Also as described in FIG. 4A above, the camera 108 can track both game controllers even though the camera is not shown in FIG. 4B. in one implementation, having multiple game controllers 420A, 420B allows the position and movement of each of the user's hands to be tracked individually and independently.

Figure 5B:
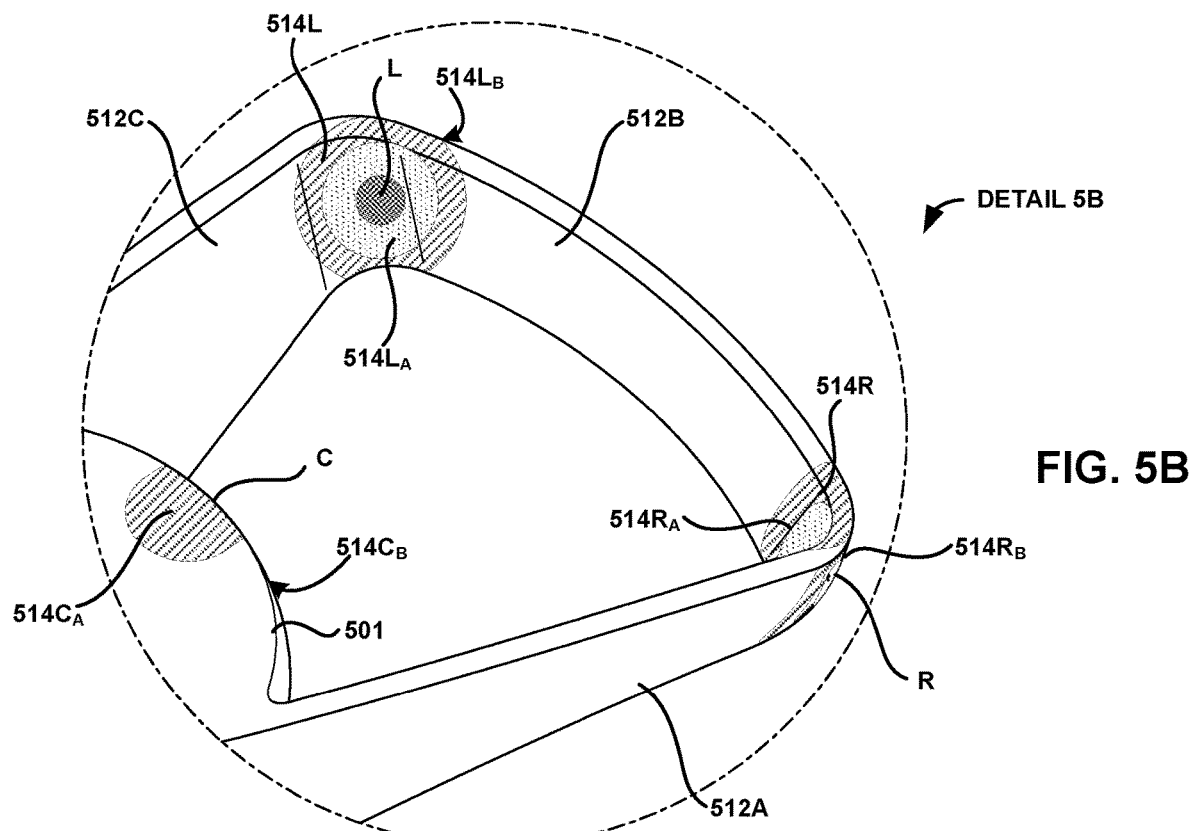
FIG. 5B is a more detailed view of the extension portion, for implementing embodiments of the present disclosure.
Figure 5A:
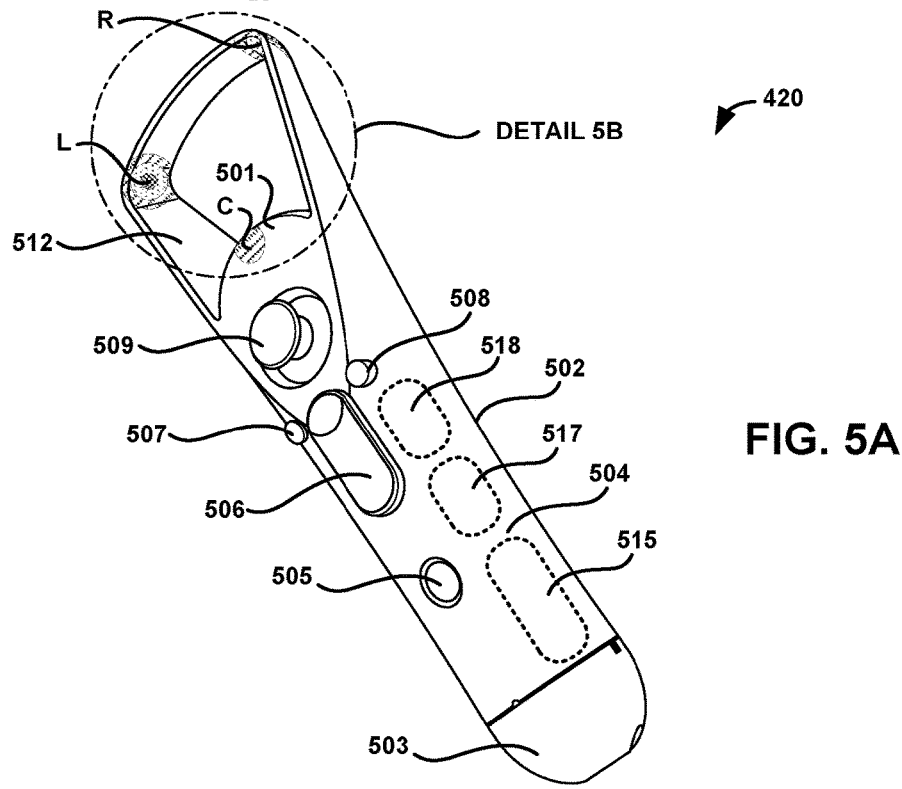
FIG. 5A is a perspective view of a game controller, for implementing embodiments of the present disclosure.

FIG. 5A is a perspective view of a game controller 420, for implementing embodiments of the present disclosure. The game controller 420 includes a body 502 and an extension portion 512 extending from a distal end 501 of the body. The extension portion 512 can have a substantially rectangular, triangular, or trapezoidal shape as shown or any other suitable shape such as rounded or polygonal shapes.

The body 502 also includes a proximate end 503 opposite from the distal end 501 of the body and the extension portion 512 extending therefrom. The distal end 501 of the body 502 includes a central light source designated with a "C". The extension portion 512 includes two or more additional light sources designated "L" for the left light source and designated "R" for the right light source. It should be noted that while three light sources are discussed herein, two or more than three light sources can be utilized similar to the discussion of three light sources described herein. The light sources C, L and R can be any suitable light source such as a light emitting diode (LED) or any suitable lamp or light source such as a plasma lamp, a fluorescent lamp, an incandescent lamp or a halogen lamp and combinations of any suitable types of light sources. Each of the light sources C, L and R can include one or more light sources. By way of example, the right light source R can include a red LED, a green LED and a blue LED and/or an array or multiple LEDs of multiple colors.

The proximate end 503 can include a removable cap or other access such as might be used for battery access or servicing the internal components of the game controller 420. The body 502 also includes multiple controller buttons 505, 506, 507, 508 and 509 for a user to input to the game controller 420. One or more of the controller buttons can also be a biometric sensor capable of receiving biometric information from the user such as fingerprints, temperature, heart rate, grip pressure, humidity and moisture.

The game controller 420 can also include inertial sensors 515, a processor 517 and a communication link 518 for communicating to the computing system 106. The inertial sensors 515 can include one or more of a magnetometer, an accelerometer, and/or a gyroscope. The inertial sensors 515 are coupled to the processor 517 and, in some implementations, can detect the location, orientation and movement of the game controller 420. The processor 517 can communicate this location, orientation and movement information from the inertial sensors via the communication link 518 and/or the light sources C, L and R. The game controller 420 can also include additional components such as movement and balance simulation devices that can adjust the balance and weight of the game controller to simulate different devices the user may be using in the virtual environment.

The processor 517 is also coupled to the controller buttons 505, 506, 507, 508 and 509 so as to receive the input signals from the controller buttons. The processor 517 is also coupled to the central light source C, the left light source L and the right light source R for outputting respective light source signals to each of the light sources. It should be understood that each of the central light source C, the left light source L and the right light source R can emit one or more different light signal outputs. The light sources C, L and R can each emit one or more different colors or bands of light to indicate information to the user or the camera 108 or the HMD 102. The different colors or light signals output by the light sources C, L and R can aid the camera 108 or the HMD 102 in differentiating between each of the light sources C, L and R. The light emitted by each of the light sources C, L and R can be in the infrared, visible or ultraviolet spectrum or any other suitable spectrum, as may be desired. By way of example, the central light source C can emit a light in the red spectrum, the left light source L can emit a light in the green spectrum and the right light source R can emit a light in the yellow spectrum.

The light emitted by each of the light sources C, L and R can be modulated to embed information in the emitted light so as to transmit information to the user or the camera 108. By way of example, the central light source C can emit a light embedded with a first signal to cause the central light source C to visibly flash to indicate to the user that the game being played is at a point of interest to the user. The left light source L can emit a light embedded with a second signal to cause the left light source L emit a light signal with movement information embedded within the light that is detectable by the camera 108 or the HMD 102. The right light source R can emit a light embedded with a third signal to cause the right light source L emit a light signal corresponding to a user's action such as a muzzle flash of a virtual gun that can be detected by the camera 108, the HMD 102 or another user's HMD in the case a multiple users in the same room playing the same game or for the benefit of non-HMD observers in the room with the user.

FIG. 5B is a more detailed view of the extension portion 512, for implementing embodiments of the present disclosure. The L light source is disposed in the left portion of the extension portion 512. The R light source is disposed in the right portion of the extension portion 512. The extension portion 512 includes at least a portion that is translucent to the light sources such that the light sources are visible by the camera 108 (not shown) from both sides of the extension portion. By way of example, light source L, is disposed in a left portion designated by the shaded area 514L of the extension portion. The shaded area 514L is translucent to the light source L so that the light emitted from light source L is emitted through both sides $514_{LA}$ and $514_{LB}$ of the extension portion. Similarly, light source R, is disposed in a right portion designated by the shaded area 514R of the extension portion 512. The shaded area 514R is translucent to the light source R so that the light emitted from light source R is emitted through both sides $514_{RA}$ and $514_{RB}$ of the extension portion 512.

In another implementation, each of the light sources C, L and R can include two or more light sources. By way of example, left light source L can include a first left light source mounted on side $514_{LA}$ a second left light source mounted on side $514_{LB}$. Similarly, right light source R can include a first right light source mounted on side $514_{RA}$ a second right light source mounted on side $514_{RB}$. Similarly, central light source C can include a first central light source mounted on side $514_{CA}$ a second central light source mounted on side $514_{CB}$. Each of the light sources C, L and R can include a lens or other focusing mechanism as is well known in the art. The lens can focus, broaden or magnify the light emitted from each of the light sources C, L and R.

In some implementations the extension portion 512 can also be subdivided into three or more segments. By way of example a left segment 512C extends from the distal end 501 of the body 502 toward the left light source L. Similarly, a right segment 512A extends from the distal end 501 of the body 502 toward the right light source R. An optional third portion 512B can extend between the left light source L and the right light source R so as to strengthen the extension portion 512 and maintain a known distance and orientation between the left light source L and the right light source R. It should be noted that as illustrated in FIGS. 5A and 5B the left light source L and the right light source R are disposed in respective corners however as will be illustrated below other shapes of the extension portion 512 can also be used.

Figure 5D:
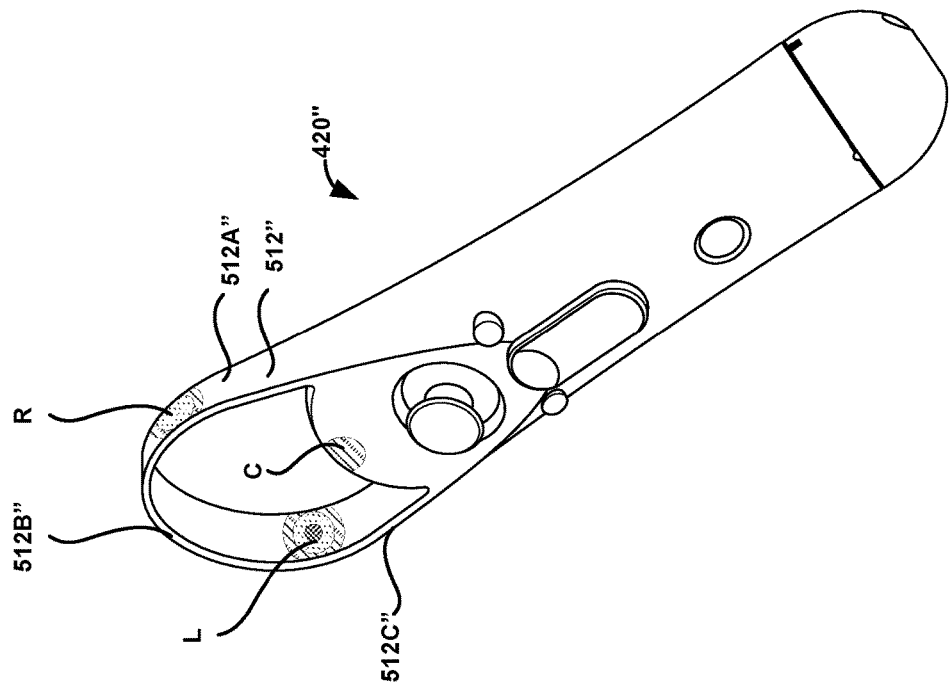
FIG. 5D is a perspective view of another implementation of a game controller, for implementing embodiments of the present disclosure.
Figure 5C:
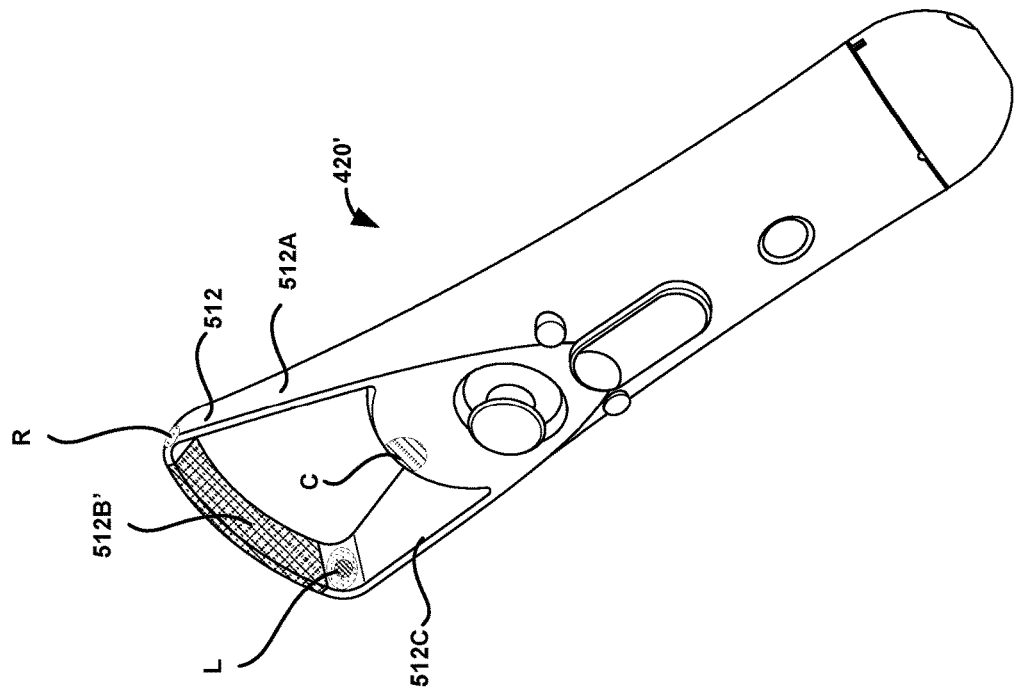
FIG. 5C is a perspective view of another implementation of a game controller, for implementing embodiments of the present disclosure.

FIG. 5C is a perspective view of another implementation of a game controller 420', for implementing embodiments of the present disclosure. The game controller 420' includes an alternative third portion 512B' of the extension portion 512. The alternative third portion 512B' can be formed of a material that is either translucent or opaque to the central light source C. Forming the alternative third portion 512B' of a material that is translucent to the central light source C can allow the camera 108 (not shown) to more easily track the location of light source C. In some implementations it may be desirable to block the light emitted from light source C in certain orientations of the game controller 420 and in such implementations, it may be desirable to form the alternative third portion 512B' from a material that is opaque to the central light source C. the thickness of the extension portions FIG. 5D is a perspective view of another implementation of a game controller 420", for implementing embodiments of the present disclosure. The game controller 420" can include an extension portion 512" that is substantially rounded as opposed to the somewhat rectangular, triangular, or trapezoidal shape as described in FIGS. 5A and 5B above. The thickness of the extension portions can also vary. In some implementations, the extension portions can be soft and flexible.

In one or more implementations additional light sources can be included in each of the extension portions. By way of example, one or more of the extension portions 512A and 512C can include a row light sources or another arrangement of light sources, e.g., circle, triangle, rectangle, selected shape, outline or other arrangement of light sources and combinations thereof. In one example, the multiple light sources can be arranged in the form a decorative shape or a company logo or other desired shape. Each of the light sources can emit one or more colors of light. By way of example, in one implementation the one or more light sources in each of the extension portions 512A and 512C can be red light sources and the one or more central light sources can be a green light sources. The one or more light sources in each of the extension portions 512A and 512C and the one or more central light sources can include multi-colored light sources.

Figures 6, 7:
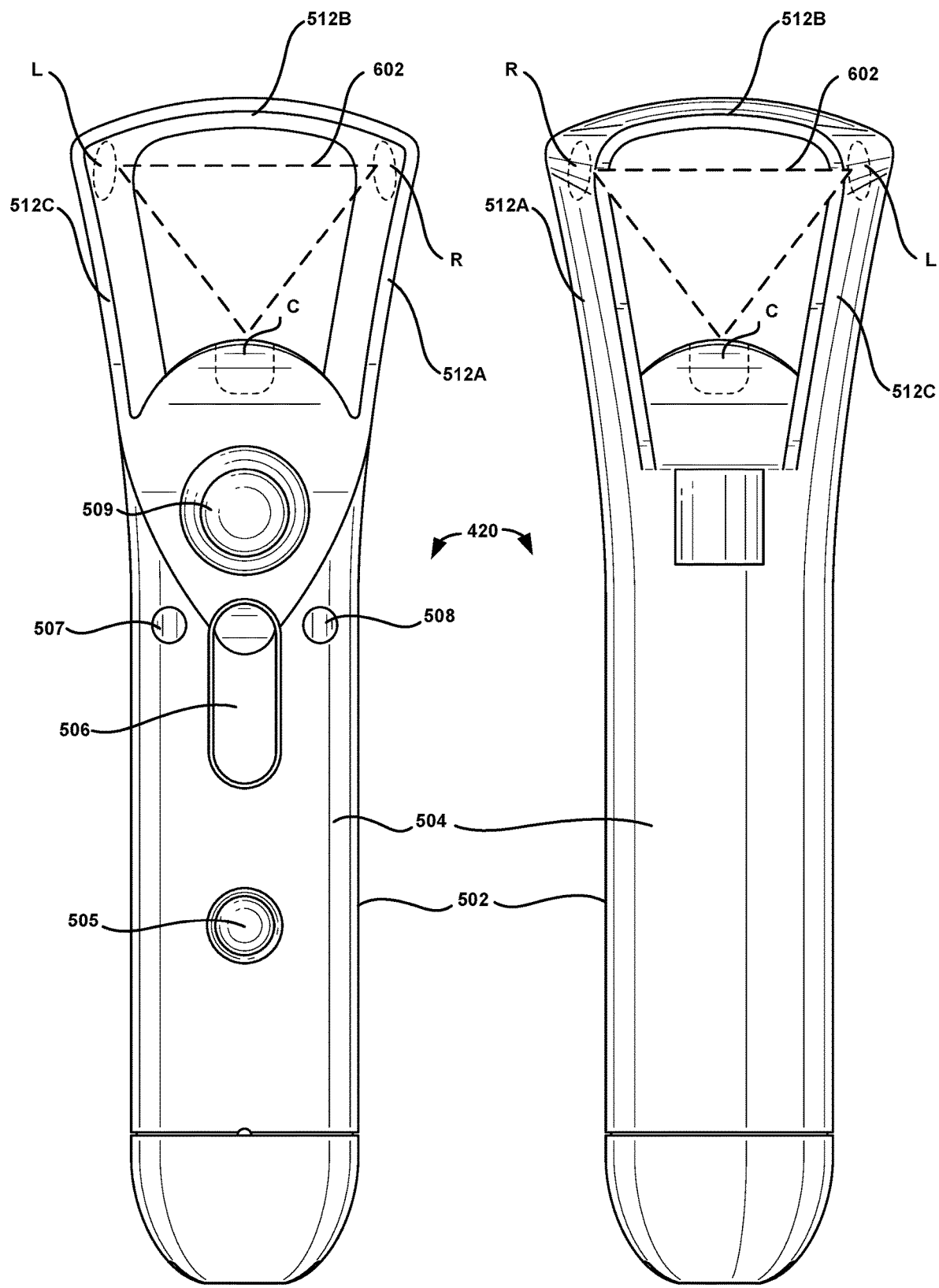
FIG. 6 is a top view of the game controller, for implementing embodiments of the present disclosure.
FIG. 7 is a bottom view of the game controller, for implementing embodiments of the present disclosure.

FIG. 6 is a top view of the game controller 420, for implementing embodiments of the present disclosure. FIG. 7 is a bottom view of the game controller 420, for implementing embodiments of the present disclosure. The top and bottom views of the game controller 420, illustrate the relative location relationship between the central light source C, the left light source L, and the right light source R. This relative location relationship of the light sources C, L and R define a triangle 602, as shown. When viewed from a viewing plane parallel to a game controller plane containing the triangle 602, as shown in FIG. 6, the triangle is a substantially equilateral triangle.

As will be described in the following description, defining the position, location, orientation and movement of the triangle 602 corresponds to the position, location, orientation and movement of the game controller plane and the game controller itself. Having the light sources C, L and R visible from the inside surfaces 514LA and 514RA of the extension portion 512, such as in a top view (FIG. 6) or a bottom view (FIG. 7) helps to define the triangle 602. Also having the light sources C, L and R visible outside from surfaces 514LB and 514RB from the extension portion 512 assists in continuous tracking the position, location, orientation and movement of the game controller from a top view, through a distal end view (FIG. 10) to a bottom view or from a top view, through a right side view (FIG. 9) to a bottom view, and combinations thereof.

The computer 106 executing the game can use the position, location, orientation and movement of the triangle 602 to determine the position, location, orientation and movement of the game controller and use that information to feed back into the game application. For example, the position, location, orientation and movement of the triangle 602 can be used by the game to determine accuracy of a baseball bat swing when the game controller 420 is simulating a baseball bat or determining the accuracy and success of a parry or thrust in a fencing game when the game controller is simulating a sword or the accuracy of a shot when the game controller is simulating a shooting weapon such as a rifle or pistol. The game controller 420 can simulate many other types of devices that may be tracked and the position, location, orientation and movement of the triangle 602 can be used by the game.

Figure 8:
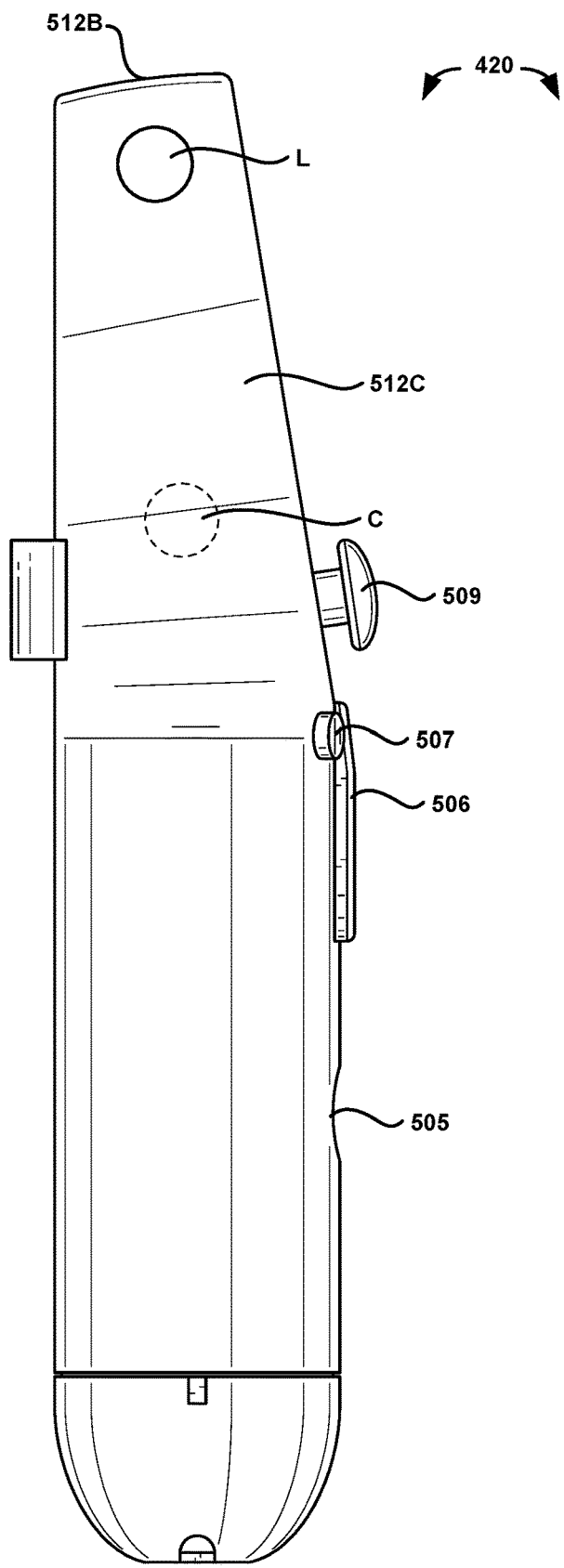
FIG. 8 is a left side view of the game controller, for implementing embodiments of the present disclosure.

FIG. 8 is a left side view of the game controller 420, for implementing embodiments of the present disclosure. The left light source L is shown in solid line to indicate that the light emitted from the left light source L is visible through the left side of the game controller 420. The central light source C is shown in phantom to illustrate the relative location relationship between the central light source C and the left light source L. The right light source R is not shown as it is hidden behind the left light source L.

The game controller 420 can be formed from any suitable material. By way of example the game controller 420 can be formed from plastic or metal and combinations thereof. The game controller 420 can be substantially rigid or flexible or include rigid portions and flexible portions. The shape, size and texture of the game controller 420 from that shown in the figures herein. By way of example, the grip portion may have roughened surfaces or raised grips or softer material or any other surface that can provide improved grip to a user's hand.

Figure 9:
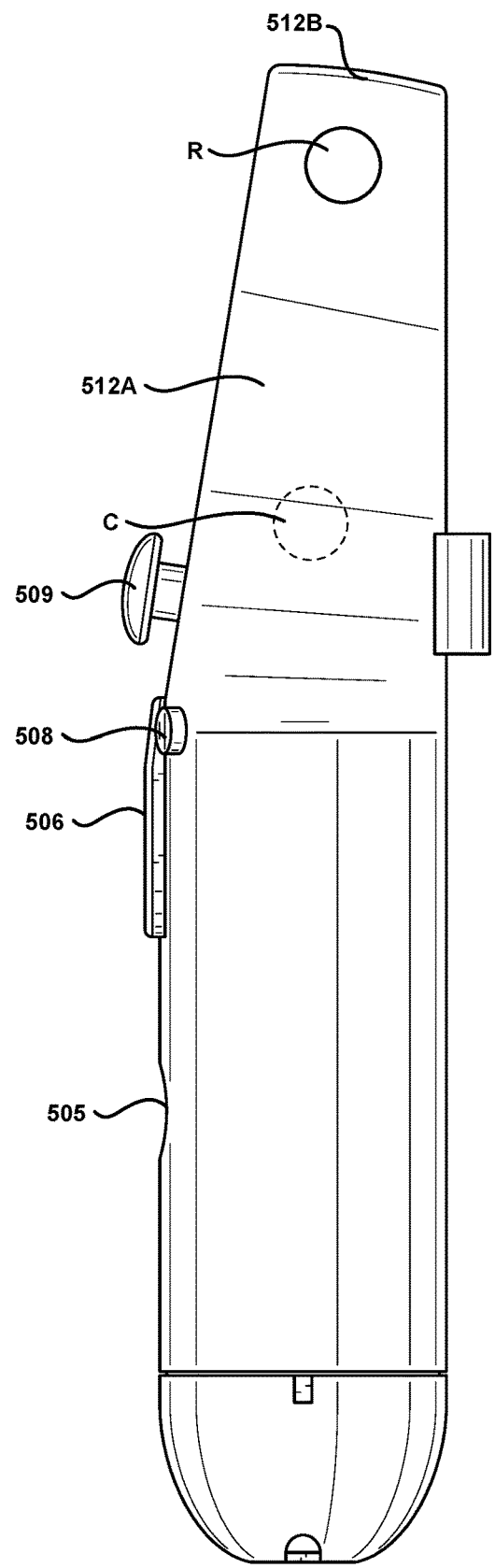
FIG. 9 is a right side view of the game controller, for implementing embodiments of the present disclosure.

FIG. 9 is a right side view of the game controller, for implementing embodiments of the present disclosure. The right light source R is shown in solid line to indicate that the light emitted from the right light source is visible through the right side of the game controller 420. The central light source C is shown in phantom to illustrate the relative location relationship between the central light source C and the right light source R. The left light source L is not shown as it is hidden behind the right light source R.

In one or more implementations the right or left portions 512A, 512C can be formed of a material either translucent or opaque to the light emitted from the central light source C, as may be desired for tracking the central light source C by the camera 108 (not shown).

As shown in FIGS. 8 and 9, the right and left portions 512A, 512C can be tapered and/or angled as they extend away from the distal end 501 of the body 502. The tapered and/or angled right and left portions 512A, 512C can act to offset the third portion 512B in one direction or another. The benefits of the tapered and/or angle and offsetting the third portion 512B will be described in more detail below as the camera 108 tracks the left light source L, the right light source R and the central light source C as the controller 420 is moved.

Figure 10:
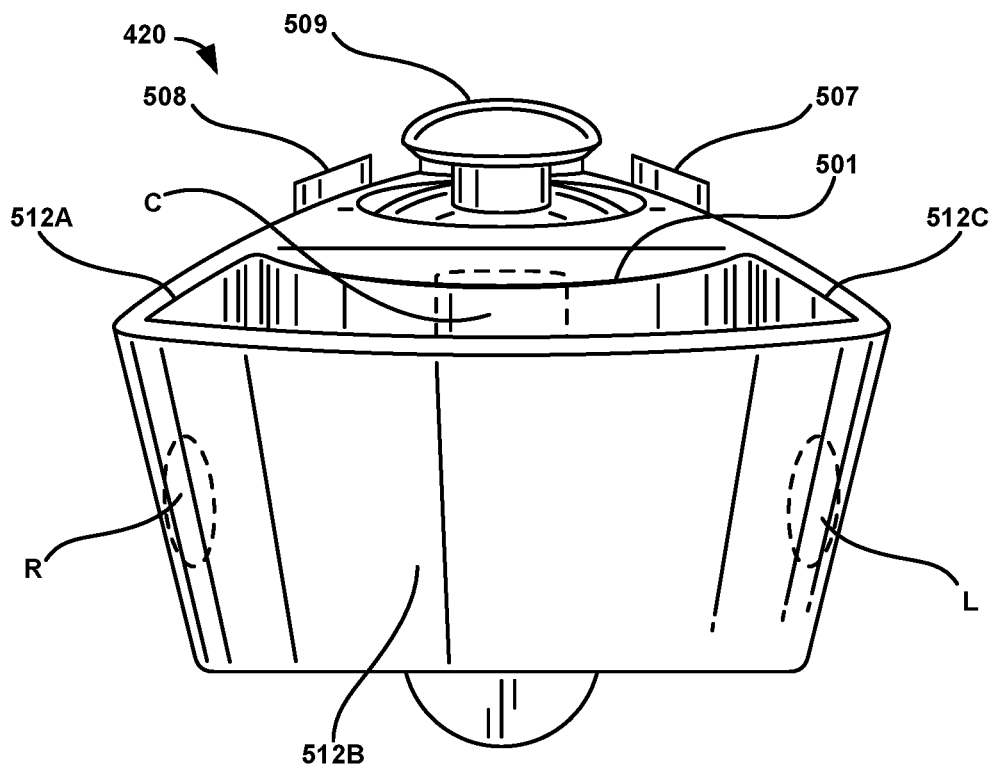
FIG. 10 is a detailed view of the distal end 501 view of the game controller, for implementing embodiments of the present disclosure.
Figure 11:
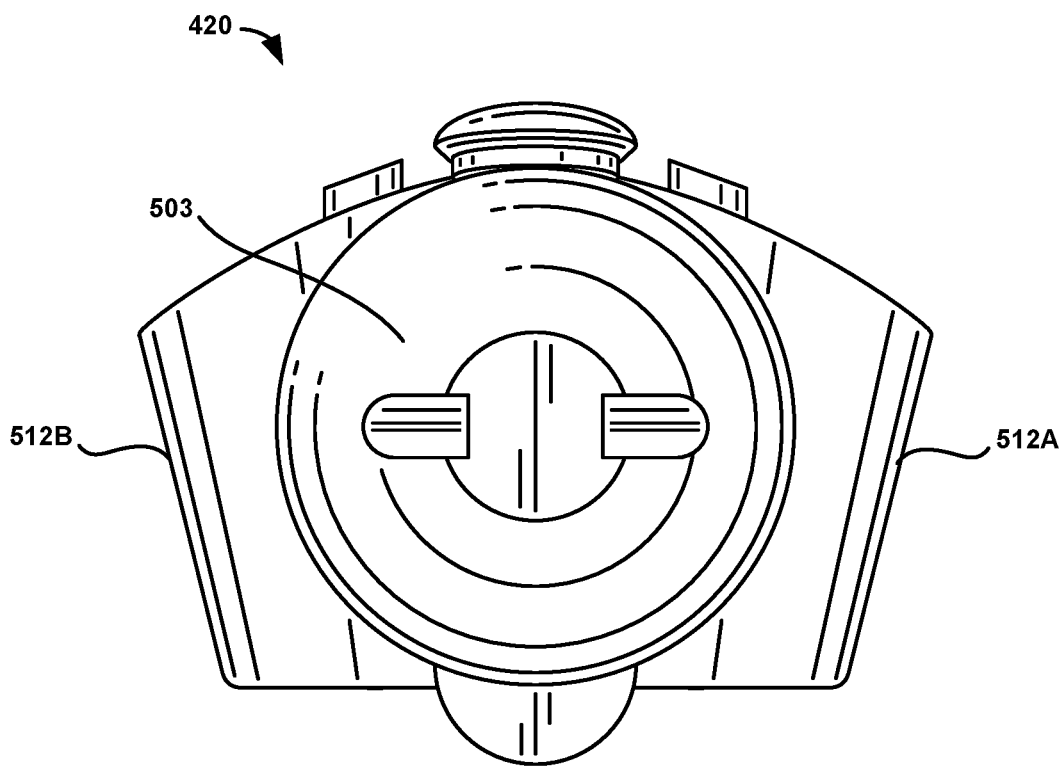
FIG. 11 is a detailed view of the proximate end 503 view of the game controller, for implementing embodiments of the present disclosure.

FIG. 10 is a detailed view of the distal end 501 view of the game controller 420, for implementing embodiments of the present disclosure. FIG. 11 is a detailed view of the proximate end 503 view of the game controller 420, for implementing embodiments of the present disclosure. While not shown, it should be understood that the game controller 420 can include light sources in addition to light sources C, L and R. By way of example, each of the extension portions 512A, 512B, 512C can include multiple light sources, e.g. 3, 4, 5, 6 or an array or an arrangement of light sources. Each of the multiple light sources can be the same or varying sizes, intensities and colors and oriented in varying angles relative to the game controller 420 and combinations thereof.

The material of the game controller can also act as a diffuser to diffuse the light emitted from one or more of the light sources C, L and R. The diffused light can, in some implementations, be tracked and a centroid of the diffused light determined by processing one or more images of the diffused light. The diffusing function can vary from the central portion outward of each diffused light source. By way of example the central portion can be a greater or brighter intensity than the portions of the diffused light source further from the central portion. In another implementation the portions of the diffused light source further from the central portion can have a greater or brighter intensity than the central portion.

Figure 12B:
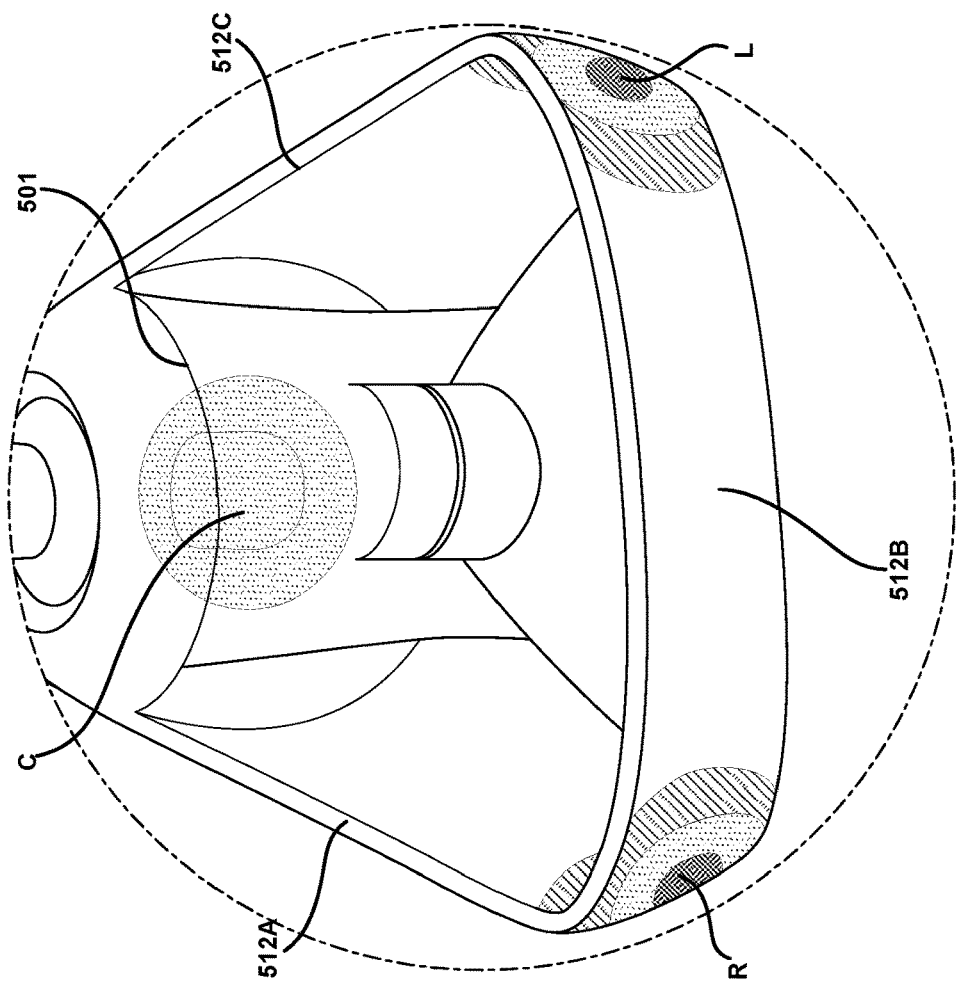
FIG. 12B is a detailed perspective view of the distal end of the game controller, for implementing embodiments of the present disclosure.
Figure 12A:
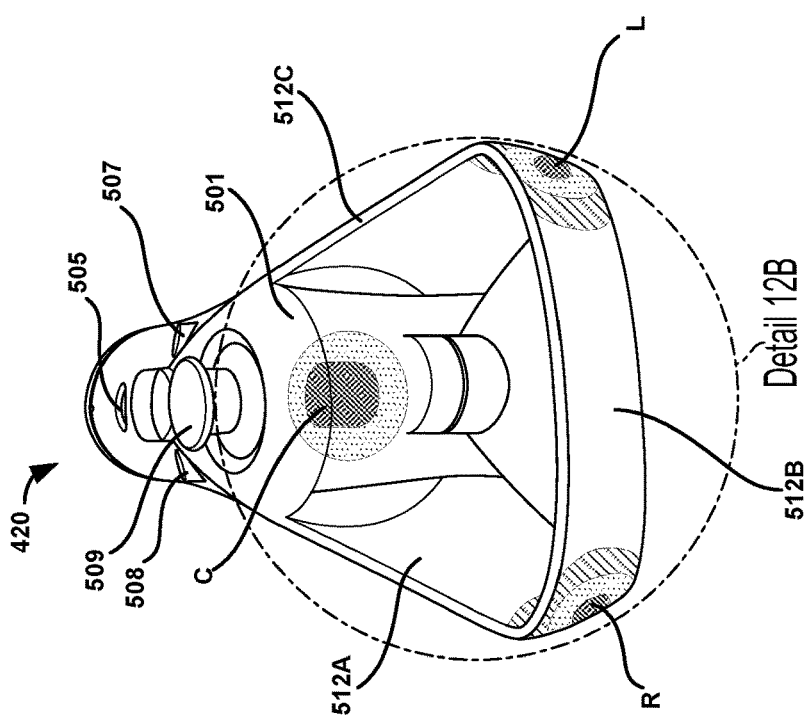
FIG. 12A is a perspective view of the distal end of the game controller, for implementing embodiments of the present disclosure.

FIG. 12A is a perspective view of the distal end 501 of the game controller 420, for implementing embodiments of the present disclosure. FIG. 12B is a detailed perspective view of the distal end 501 of the game controller 420, for implementing embodiments of the present disclosure. The third portion 512B of the extension portion 512 can have a thinner width than the right and left portions 512A, 512C. The thinner width of the third portion 512B of the extension portion 512 can act to further offset the third portion.

Figure 13A:
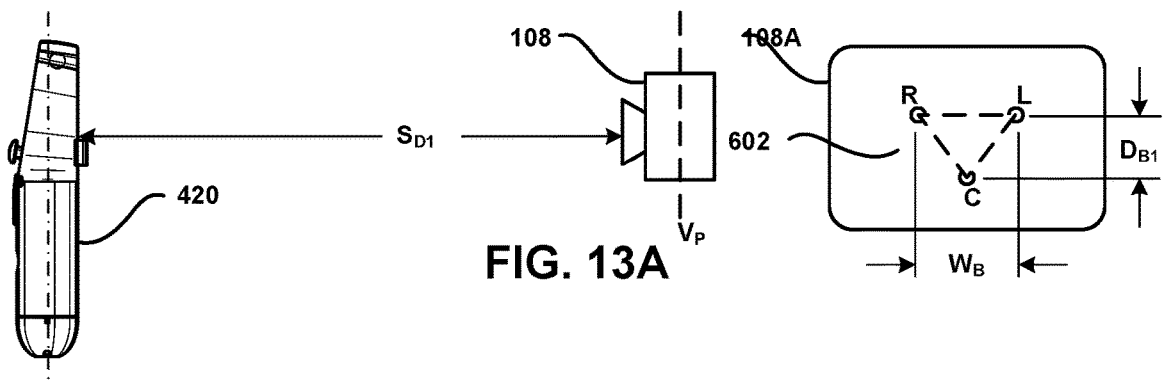
FIGS. 13A-D illustrate different camera views of the light sources mounted in the game controller as the game controller is rotated about a centerline relative to the camera or HMD, for implementing embodiments of the present disclosure.

FIGS. 13A-D illustrate different camera views of the light sources C, L and R mounted in the game controller 420 as the game controller is rotated about a centerline CL relative to the camera 108 or HMD 102, for implementing embodiments of the present disclosure. As shown in FIG. 13A, the camera 108 is viewing the bottom of the game controller 420, similar to the view of FIG. 7 above. The camera 108 can detect the light sources C, L and R as shown in the display screen 108A. As the camera 108 is in a parallel plane to the bottom of the game controller 420, offset a separation distance $S_{D1}$ as a depth of the game controller 420 within the field of play visible by the camera. The camera 108 detects the light sources C, L and R in their relative to positions represented by the triangle 602. The triangle 602 has height equal to a distance $D_{B1}$ between light sources L and C and between light sources R and C that corresponds to separation distance $S_{D1}$. The triangle 602 has a width of $W_B$ that corresponds to the relative distance between light sources L and R and the separation distance $S_{D1}$. As the separation distance $S_{D1}$ increases, the relative distance between light sources L and R will appear to be smaller, however, as the actual distance between light sources L and R is fixed, then the relationship of the Pythagorean theorem can be used to determine the actual separation distance $S_{D1}$. Similarly, as the distance between light sources L and C and between light sources R and C vary, the separation distance $S_{D1}$ can be determined. When the image depicts triangle 602 with the known relative dimensions and angles separating the light sources C, L and R then the camera 108 can determine the camera is viewing the bottom of the game controller 420 from a viewing plane $V_P$ that is parallel to the centerline CL.

Note that left light source L is on the right of the image in the display 108A and right light source R is on the left in the image in the display as this orientation of the light sources L and R indicates camera or HMD is viewing the bottom of the game controller and dimensions $W_B$ and $D_{B1}$ of triangle 602 indicate that the plane of the camera is parallel to the plane of the bottom of the game controller. As will be described in the following figures, the shapes, sizes and orientations of the relative positions of the light sources C, L and R vary with the orientation of game controller and this relationship can be used to determine the orientation of the game controller.

Additional details for tracking the game controller 420 movement can also be found in the following related applications. This application is related to U.S. patent application Ser. No. 12/259,181, filed Oct. 27, 2008, and entitled "DETERMINING LOCATION AND MOVEMENT OF BALL-ATTACHED CONTROLLER", which is incorporated herein by reference in its entirety and for all purposes. This application is also related to U.S. patent application Ser. No. 12/145,455, filed Jun. 24, 2008, and entitled "DETERMINATION OF CONTROLLER THREE-DIMENSIONAL LOCATION USING IMAGE ANALYSIS AND ULTRASONIC COMMUNICATION", which is incorporated herein by reference in its entirety and for all purposes.

Figure 13B:
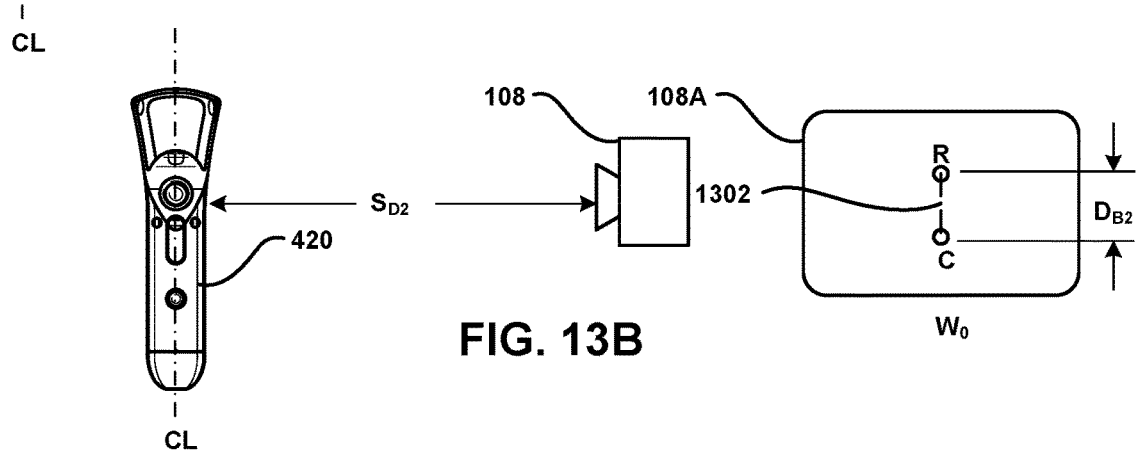

As shown in FIG. 13B, the camera 108 is viewing the right side of the game controller 420, similar to the view of FIG. 9 above. The camera 108 can detect the right light source R, an possibly light source C, if the right extension portion 512A is translucent to the central light source C, as shown in the display screen 108A. The left light source L is not visible as it is blocked from the cameras view by right light source R. The camera detects the light sources C and R in their relative to positions represented by the line segment 1302 with length distance $D_{B2}$ between light sources C and R and zero width $W_0$. This linear relationship of light sources C and R indicates camera is viewing the right side of the game controller 420. Similarly, if the game controller were reversed and the camera 108 could detect the light sources C and L separated by a distance $D_{B2}$ then the camera is viewing the left side of the game controller 420. If the line segment 1302 were tilted at some angle other than vertical as shown, then the image would indicate that the game controller 420 was also tilted at a corresponding angle. Similar to above, as the separation distance $S_{D2}$ decreases (e.g., $S_{D2}<S_{D1}$) the relative distance between light sources L and R will appear to be larger than shown in FIG. 13A, however, as the actual distance between light sources L and R is fixed, then the relationship of the Pythagorean theorem can be used to determine the actual separation distance $S_{D2}$.

Figure 13C:
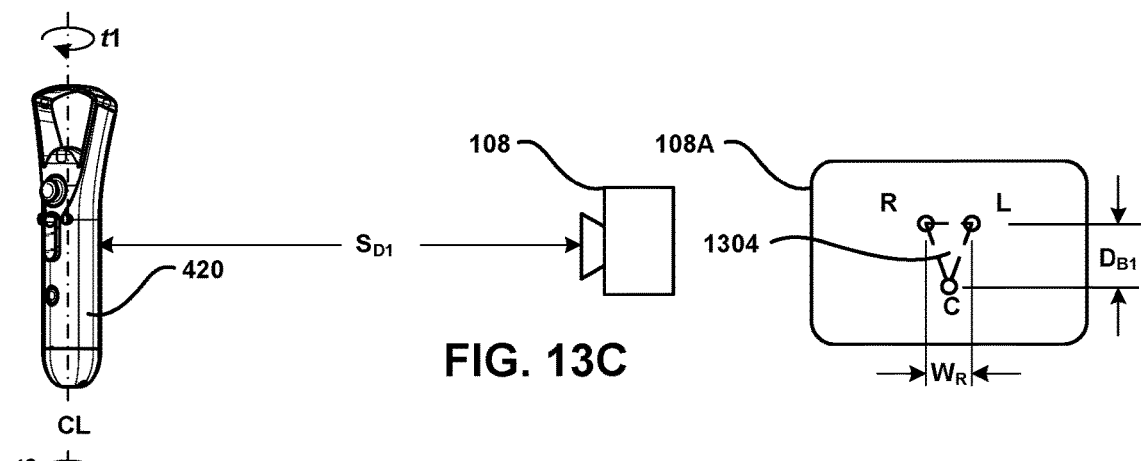

Referring now to FIG. 13C, the camera 108 is viewing the game controller 420 as it is rolled about the centerline CL by a roll angle τ1 of about 45 degrees to the right from that shown in FIG. 9 above. The camera 108 can detect the light sources C, L and R as shown in the display screen 108A. As the camera 108 is in a parallel plane to the bottom of the game controller 420, the camera detects the light sources C, L and R in their relative to positions represented by the narrowed triangle 1304. The narrowed triangle 1304 has the distance $D_B$ between light sources L and C and between light sources R and C. The narrowed triangle 1304 has a width of $W_R$ that is less than the width $W_B$. The width $W_R$ corresponds to the roll angle τ1.

Figure 13D:
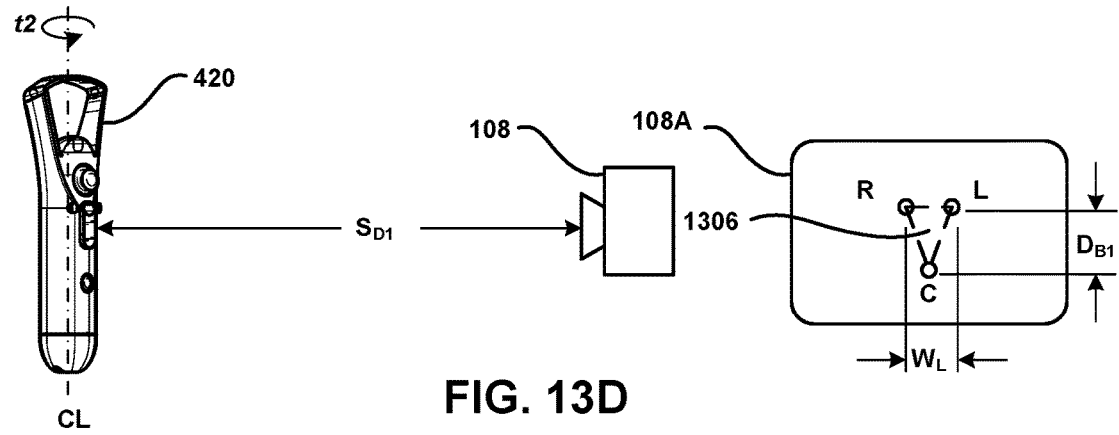

Now as shown in FIG. 13D, the camera 108 is viewing the game controller 420 as it is rolled about the centerline CL by a roll angle τ2 of about 45 degrees to the left from that shown in FIG. 9 above. The camera 108 can detect the light sources C, L and R as shown in the display screen 108A. As the camera 108 is in a parallel plane to the bottom of the game controller 420, the camera detects the light sources C, L and R in their relative to positions represented by the narrowed triangle 1306. The narrowed triangle 1306 has the distance $D_B$ between light sources L and C and between light sources R and C. The narrowed triangle 1306 has a width of $W_L$ that is less than the width $W_B$. The widths $W_R$ and $W_L$ of the narrowed triangles 1304 and 1306 corresponds to the respective roll angles τ1 and τ2 that the game controller is rolled about its centerline CL.

Referring to the above FIGS. 13A-D, the relative positions of the light sources C, L and R can be used to determine an roll angle of the game controller 420 about the centerline CL of the game controller and thus the ability to accurately track the game controller by tracking the distances and directions between the light sources as the game controller is moved such as during game play activities using the relationship of the light sources C, L and R and the trigonometric relationship described by of the Pythagorean Theorem and similar relationships. As will be discussed further other image data of the light sources C, L and R can also be used in combination with the roll angle of the game controller around the centerline CL to determine other angles of the game controller.

Figure 13E:
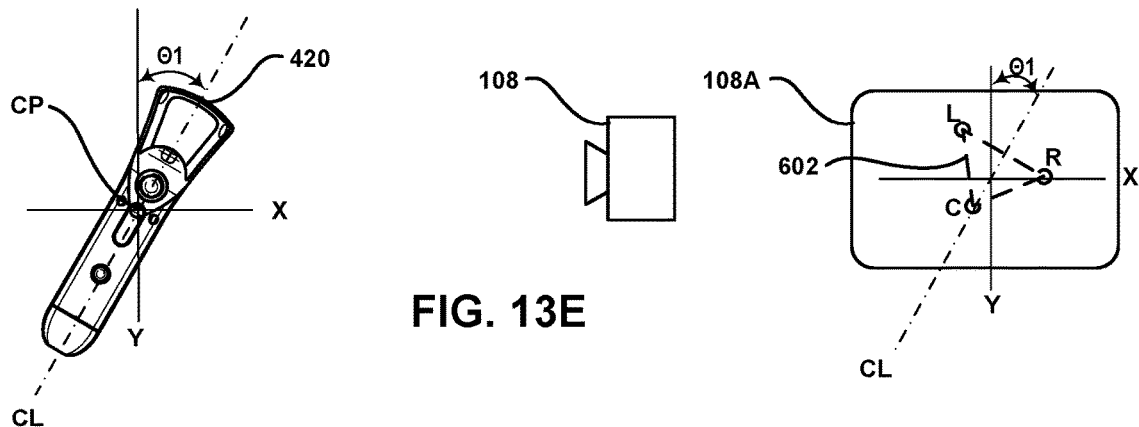
FIGS. 13E-H illustrate different camera views of the light sources mounted in the game controller as the game controller is rotated about a center point, relative to the camera or HMD, for implementing embodiments of the present disclosure.

FIGS. 13E-H illustrate different camera views of the light sources C, L and R mounted in the game controller 420 as the game controller is rotated about a center point CP, relative to the camera 108 or HMD 102, for implementing embodiments of the present disclosure. Referring to FIG. 13E, the camera 108/HMD 102 is viewing the top of the game controller 420, similar to the view of FIG. 6 above with the game controller rotated to a yaw angle θ1 between a Y-axis of a reference plane XY and the centerline CL of the game controller. The camera 108/HMD 102 can detect the light sources C, L and R as shown in the display screen 108A. When the camera 108 is in a parallel plane to the bottom of the game controller 420, the camera detects the light sources C, L and R in their relative to positions represented by the triangle 602. The triangle 602 is detected as being rotated a corresponding yaw angle θ1 between a Y-axis of a reference plane XY and the centerline CL of the game controller 420. The ability to detect all three or even only two of the light sources C, L and R allows the yaw angle θ1 of the game controller 420 to be accurately determined as the game controller is moved such as during game play activities.

Figure 13F:
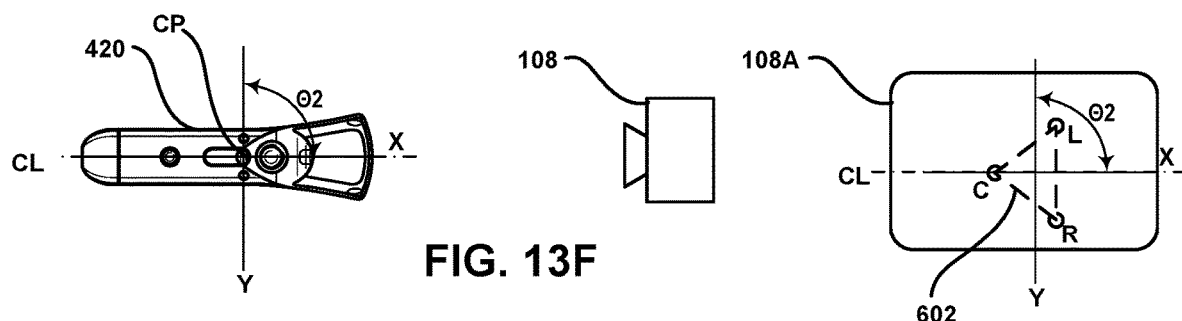
Figure 13G:
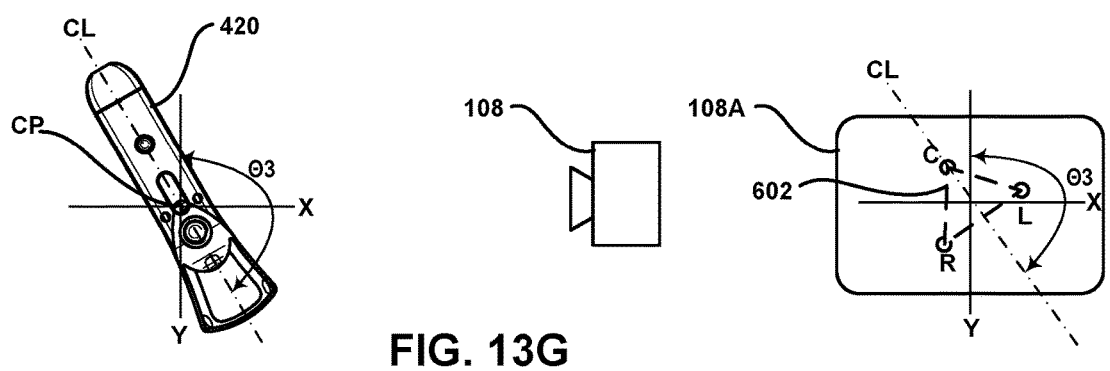
Figure 13H:
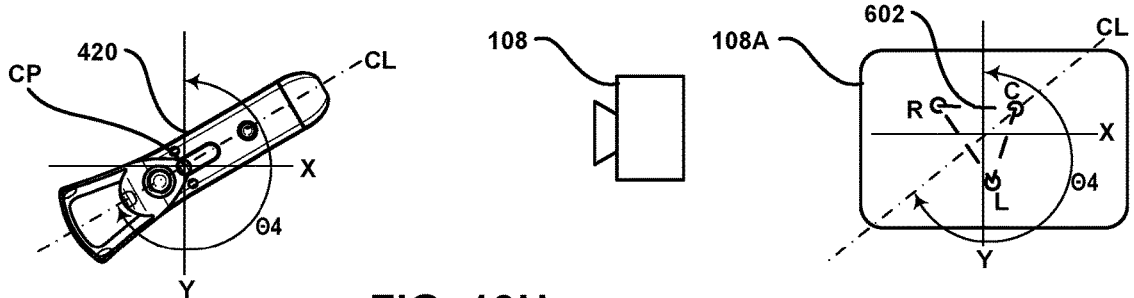

In FIG. 13F, the game controller is rotated further to the right relative to the Y-axis of the reference plane XY such that the yaw angle θ2 between the centerline C1 and the Y-axis. The ability to detect all three or even only two of the light sources C, L and R allows the yaw angle θ2 of the game controller 420 to be accurately determined as the game controller is moved. Similarly, as shown in FIGS. 13G and 13H, the ability to detect all three or even only two of the light sources C, L and R allows the respective yaw angles θ3 and θ4 of the game controller 420 to be accurately determined as the game controller is moved. As shown in the above FIGS. 13E-13H, any yaw angle θ of the game controller 420 can be determined by the corresponding yaw angle θ of the triangle 602 formed by the light sources C, L and R.

Figure 14A:
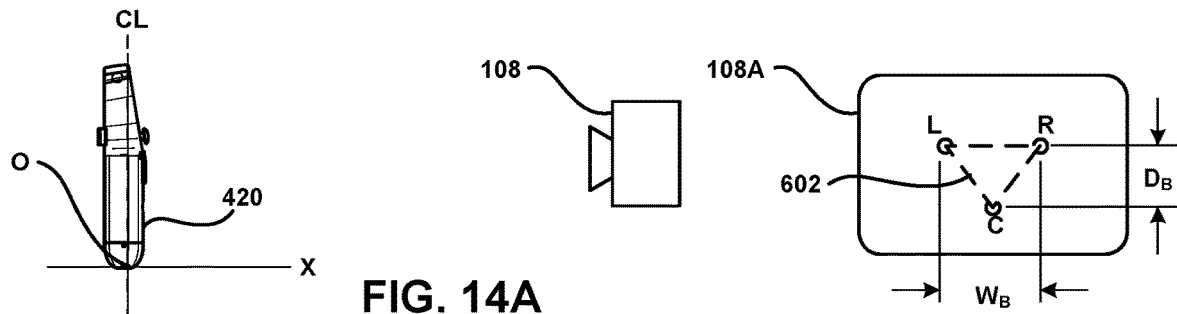
FIGS. 14A-L illustrate different camera views of the light sources mounted in the game controller as the game controller is swung through an arc through various pitch angles about an origin of a reference plane relative to the camera or the HMD, for implementing embodiments of the present disclosure.

FIGS. 14A-L illustrate different camera views of the light sources C, L and R mounted in the game controller 420 as the game controller is swung through an arc through various pitch angles about a origin O of the XY reference plane relative to the camera 108 or the HMD 102, for implementing embodiments of the present disclosure. Referring first to FIG. 14A the camera 108 is viewing the top of the game controller 420, similar to the view of FIG. 6 above. The camera 108 can detect the light sources C, L and R as shown in the display screen 108A.

As the camera 108 is in a parallel plane to the top of the game controller 420, the camera detects the light sources C, L and R in their relative to positions represented by the triangle 602. The triangle 602 has a distance $D_B$ between light sources L and C and between light sources R and C. The triangle 602 has a width of $W_B$. Note that left light source L is on the left of the image in the display 108A and right light source R is on the right in the image in the display as this orientation of the light sources L and R indicates camera or HMD is viewing the top of the game controller and dimensions $W_b$ and $D_B$ of triangle 602 indicate that the plane of the camera is parallel to the plane of the bottom of the game controller. As will be described in the following figures, the shapes, sizes and orientations of the relative positions of the light sources C, L and R vary with the orientation of game controller and this relationship can be used to determine the orientation of the game controller.

Figure 14B:
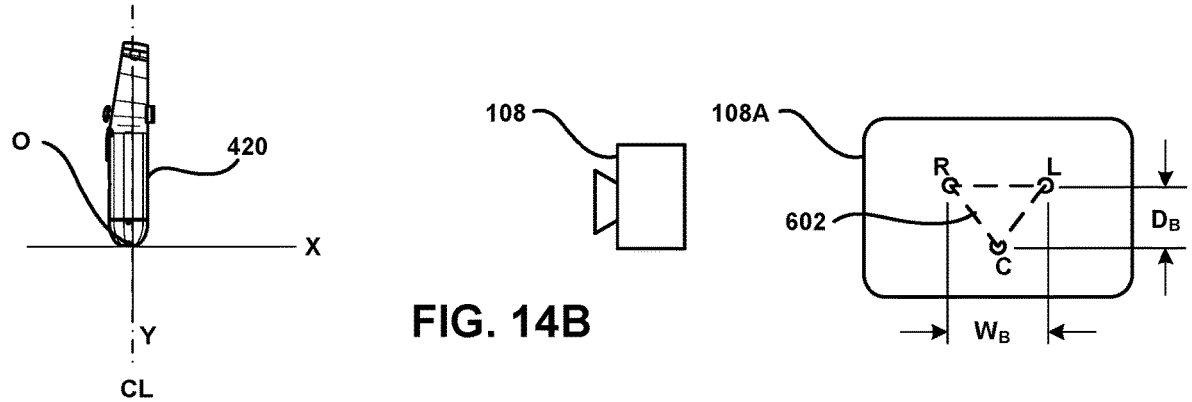

Turning to FIG. 14B the camera 108 is viewing the bottom of the game controller 420, similar to the view of FIG. 7 above. The camera 108 can detect the light sources C, L and R as shown in the display screen 108A. As the camera 108 is in a parallel plane to the top of the game controller 420, the camera detects the light sources C, L and R in their relative to positions represented by the triangle 602. The triangle 602 has a distance $D_B$ between light sources L and C and between light sources R and C thus defining the $D_B$ as the height of triangle 602. The triangle 602 has a width of $W_B$. Note that left light source L is on the right of the image in the display 108A and right light source R is on the left in the image in the display as this orientation of the light sources L and R indicates camera or HMD is viewing the bottom of the game controller and dimensions $W_B$ and $D_B$ of triangle 602 indicate that the plane of the camera is parallel to the plane of the bottom of the game controller.

Figure 14C:
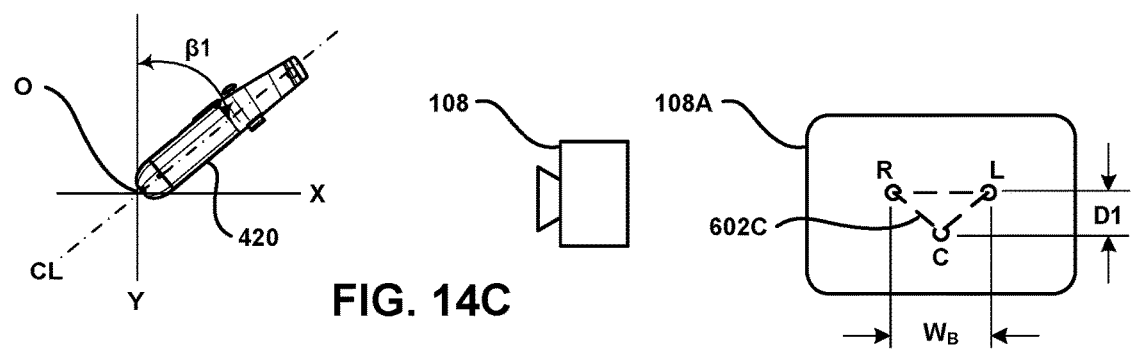

In FIG. 14C the bottom of game controller 420 is inclined toward the camera 108 at a pitch angle β1. The camera 108 can detect the light sources C, L and R as shown in the display screen 108A. As the camera 108 is not in a parallel plane to the bottom of the game controller 420, the camera detects the light sources C, L and R in their relative to positions represented by a flattened triangle 602C. The flattened triangle 602C has a height D1 between light sources L and C and between light sources R and C. The flattened triangle 602C has a width of $W_B$. Note that left light source L is on the right of the image in the display 108A and right light source R is on the left in the image in the display as this orientation of the light sources L and R indicates camera or HMD is viewing the bottom of the game controller and dimensions $W_b$ and D1 of flattened triangle 602C indicate that the plane of the camera is not parallel to the plane of the bottom of the game controller and the pitch angle β1 corresponds to the height D1 of the flattened triangle 602C by the trigonometric relationship described by of the Pythagorean Theorem and similar relationships.

Figure 14D:
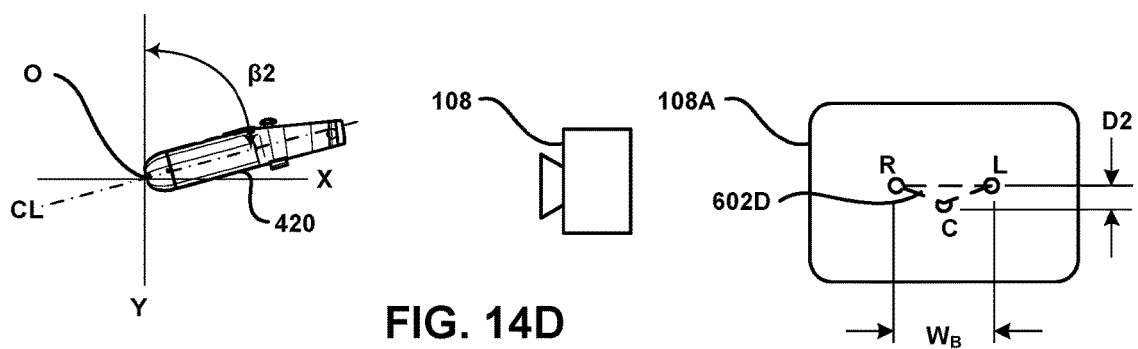

The game controller 420 is inclined further toward the camera 108 at a pitch angle β2, as shown in FIG. 14D. As a result, the camera detects the light sources C, L and R in their relative to positions represented by a further flattened triangle 602D. The further flattened triangle 602C has a distance D2 between light sources L and C and between light sources R and C. The further flattened triangle 602D has a width of $W_B$. Note that left light source L is on the right of the image in the display 108A and right light source R is on the left in the image in the display as this orientation of the light sources L and R indicates camera or HMD is viewing the bottom of the game controller and dimensions $W_B$ and D2 of further flattened triangle 602D indicate that the plane of the camera is not parallel to the plane of the bottom of the game controller and the pitch angle β2 corresponds to the height D2 of the further flattened triangle 602D.

Figure 14E:
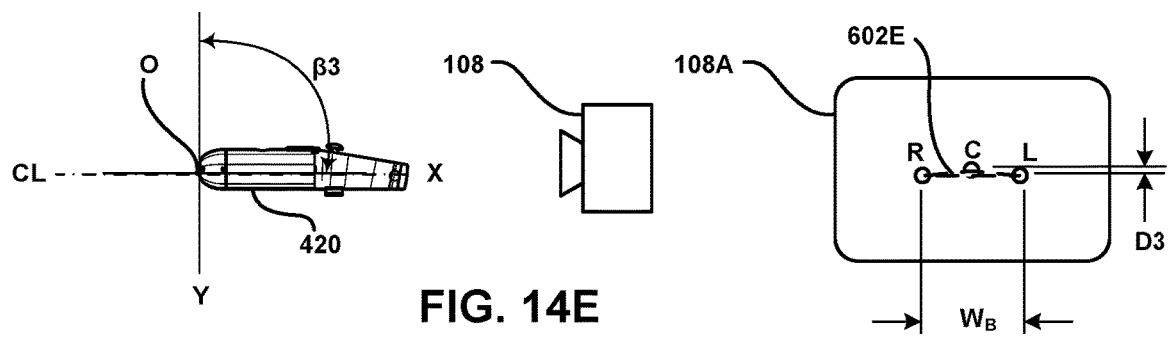

As the game controller 420 is inclined a pitch angle β3 further toward the camera 108, as shown in FIG. 14E, until the centerline is substantially aligned with the X-axis of the XY reference plane, the camera is viewing the distal end of the game controller similar to that shown in FIG. 10 above. As such, the light sources C, L and R are substantially aligned such that the height D3 of triangle 602E approaches zero and thus the height D3 of triangle 602E corresponds to the pitch angle β3.

Figure 14F:
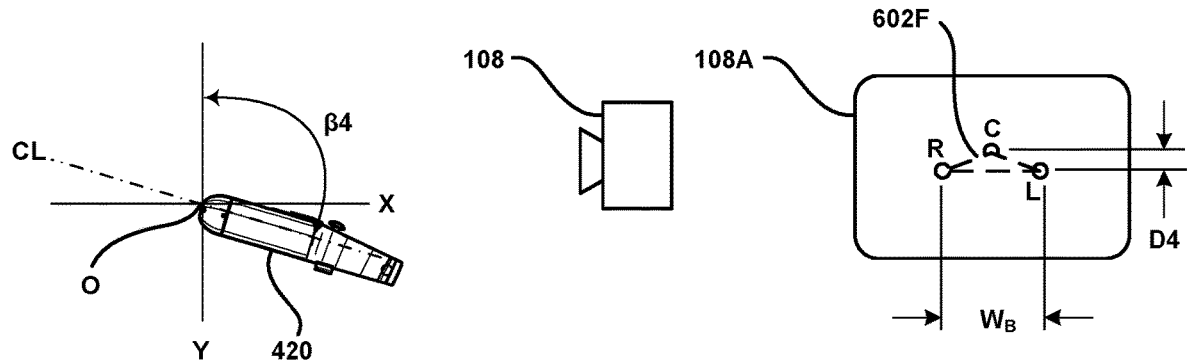

Continuing to incline the game controller 420 to a pitch angle β4 toward the camera 108, as shown in FIG. 14F, until the centerline CL is below the X-axis of the XY reference plane. The camera is viewing a perspective view of the top of the game controller, similar to that shown in FIG. 12A, from the distal end 501 of the game controller. The light sources C, L and R are detected by the camera 108 to form a triangle 602F with a height D4 corresponding to the pitch angle β4.

Figure 14G:
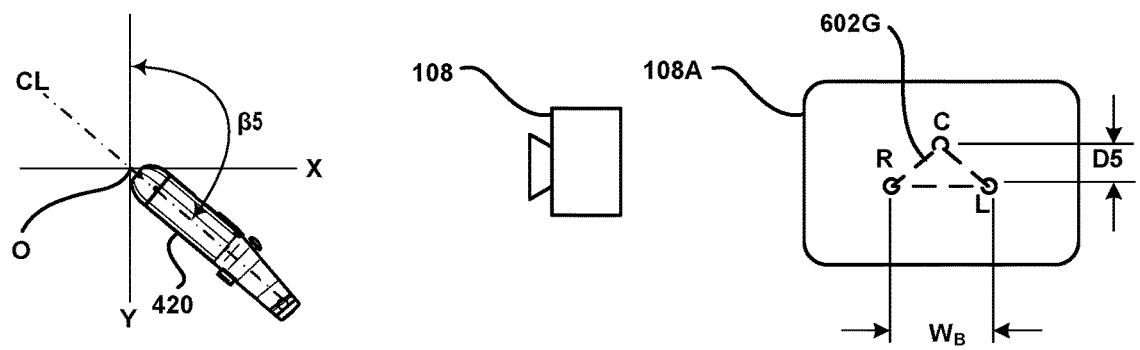

Continuing to incline the game controller 420 to a pitch angle β5 toward the camera 108, as shown in FIG. 14G, until the centerline CL is further below the X-axis of the XY reference plane. The light sources C, L and R are detected by the camera 108 to form a triangle 602G with a height D5 corresponding to the pitch angle β5.

Figure 14H:
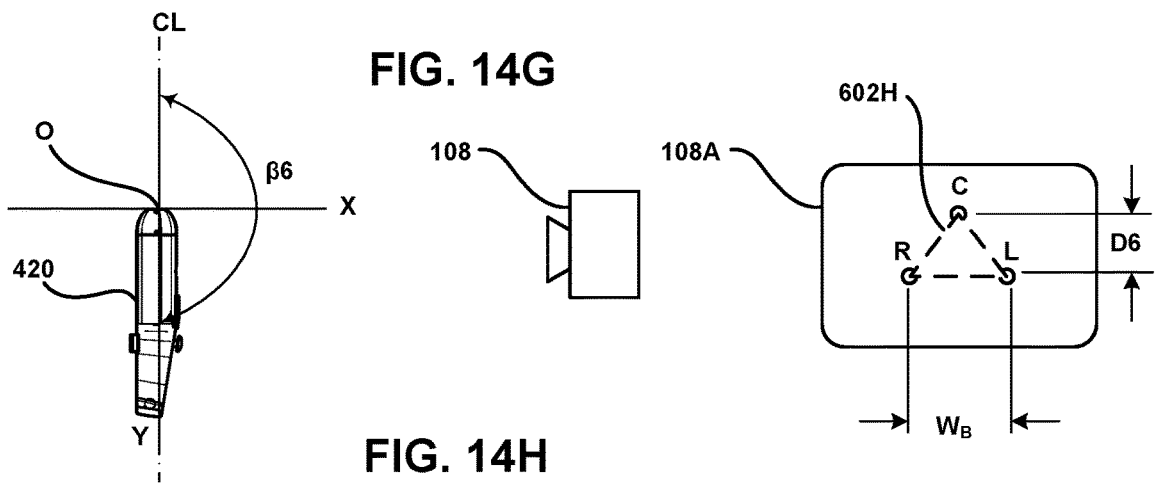

Continuing to incline the game controller 420 to a pitch angle β6 toward the camera 108, as shown in FIG. 14H, until the centerline CL is substantially aligned with the Y-axis of the XY reference plane. The light sources C, L and R are detected by the camera 108 to form a triangle 602H with a height D6 corresponding to the pitch angle β6.

Figure 14I:
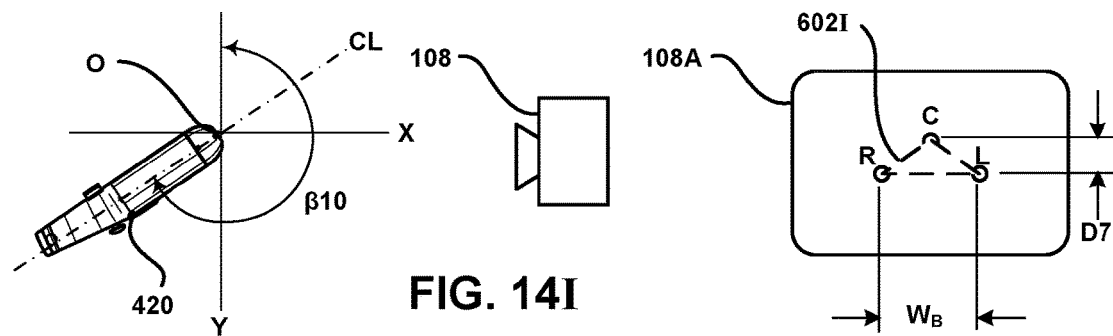

Continuing to incline the game controller 420 to a pitch angle β7 toward the camera 108, as shown in FIG. 14I. The light sources C, L and R are detected by the camera 108 to form a triangle 602I with a height D7 corresponding to the pitch angle β7.

Figure 14J:
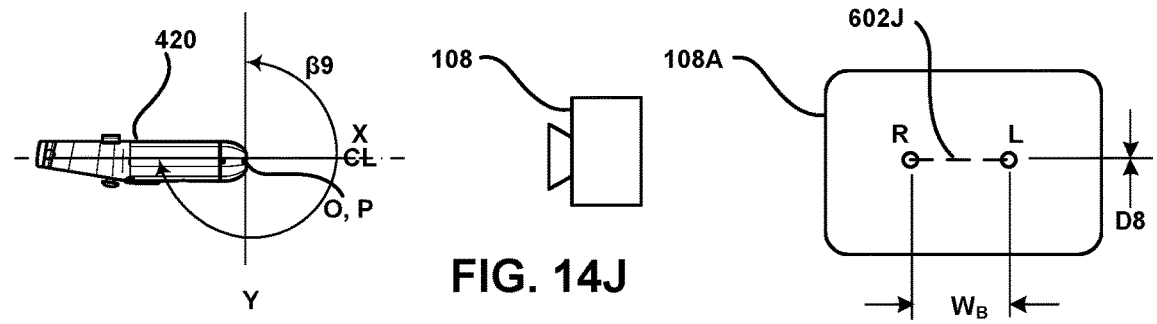

Continuing to incline the game controller 420 to a pitch angle β8 toward the camera 108, as shown in FIG. 14J. The light sources C, L and R are detected by the camera 108 to form a triangle 602J with a height D8 corresponding to the pitch angle β8. It should be noted that in the pitch angle β8 the camera is viewing the proximate end 503 of the game controller 420 and thus central light source C may not be visible to the camera 108. In this instance and in other instances described herein an optional proximate light source P could be utilized to provide additional relative position information to aid in determining the orientation of the game controller 420, similar to the light sources C, L and R.

Figure 14K:
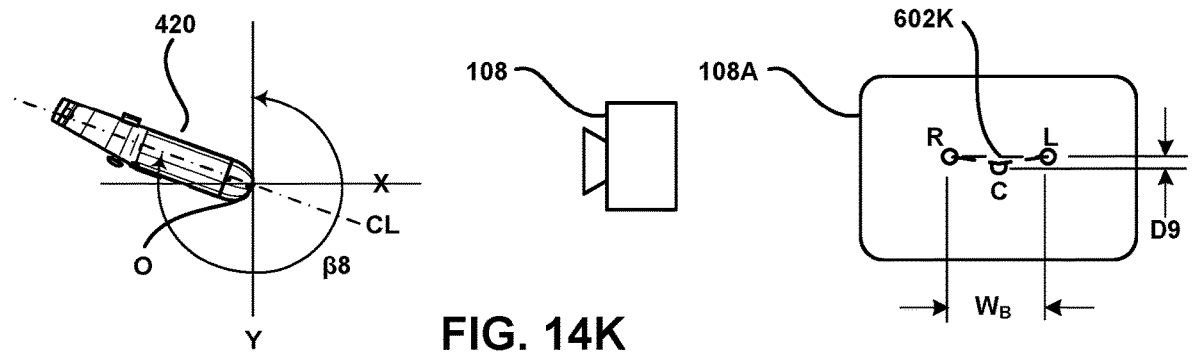

Continuing to incline the game controller 420 to a pitch angle β9 toward the camera 108, as shown in FIG. 14K. The light sources C, L and R are detected by the camera 108 to form a triangle 602K with a height D9 corresponding to the pitch angle β9.

Figure 14L:
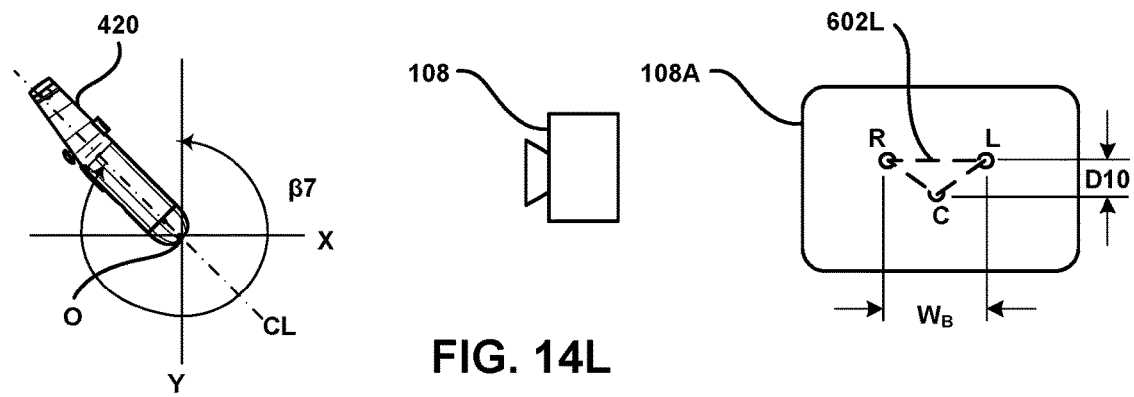

Continuing to incline the game controller 420 to a pitch angle β10 toward the camera 108, as shown in FIG. 14L. The light sources C, L and R are detected by the camera 108 to form a triangle 602L with a height D10 corresponding to the pitch angle β10. As described above, the game can track the position, location, orientation and movement of the game controller 420 through the roll, yaw and pitch of the triangle 602 defined by the light sources C, L, R and optional light source P. Thus, accurately define the position, location, orientation and movement of the game controller 420. The visually obtained and derived information of light sources C, L, R and optionally P, can optionally be combined with the inertial data from the various inertial sensors 515 in the game controller to further refine the accuracy of the position, location, orientation and movement of the game controller 420.

Figure 15:
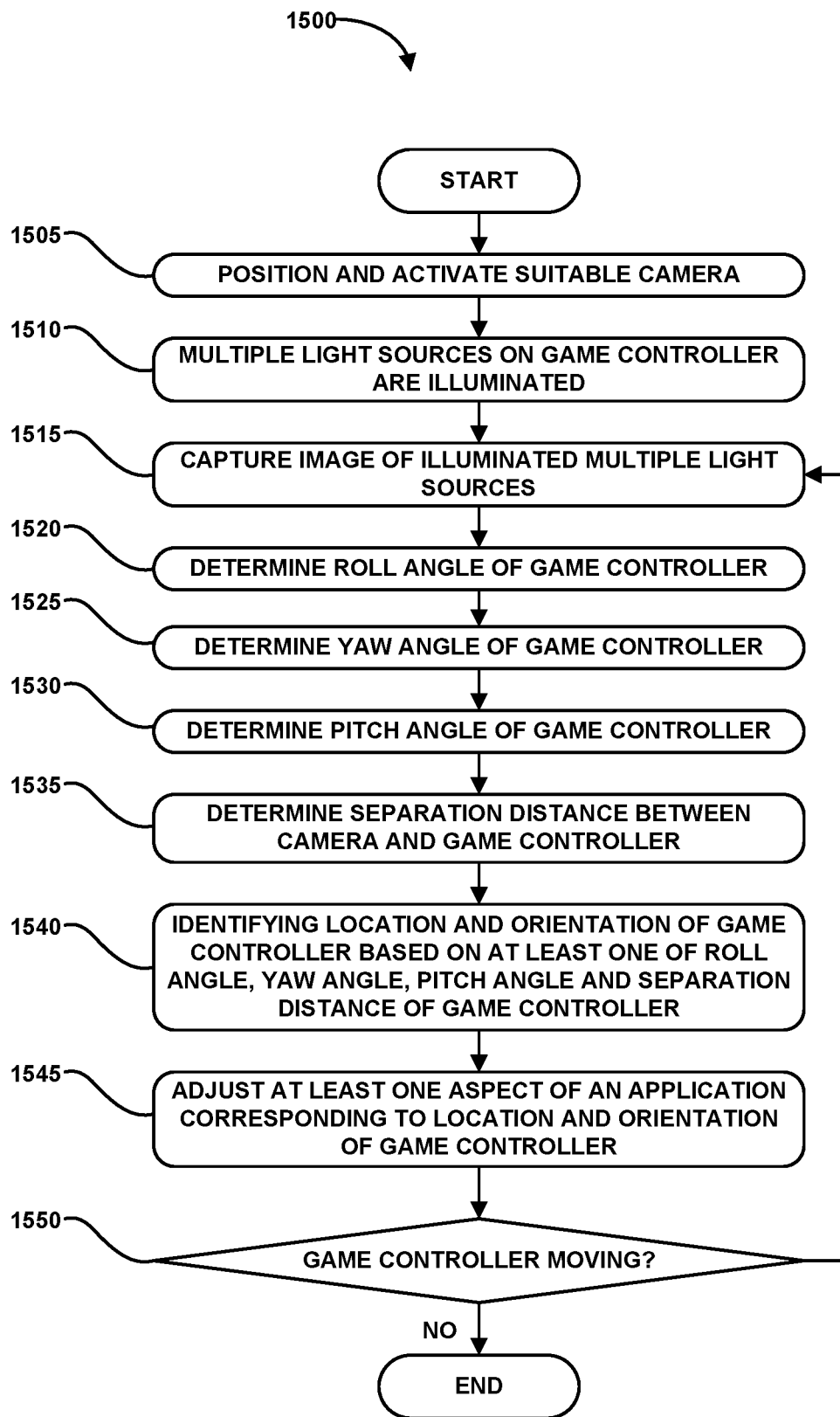
FIG. 15 is a flowchart diagram that illustrates the method operations performed in tracking the motion of the game controller using the light sources, for implementing embodiments of the present disclosure.

FIG. 15 is a flowchart diagram that illustrates the method operations performed in tracking the motion of the game controller 420 using the light sources C, L and R, for implementing embodiments of the present disclosure. The operations illustrated herein are by way of example, as it should be understood that some operations may have sub-operations and in other instances, certain operations described herein may not be included in the illustrated operations. With this in mind, the method and operations 1500 will now be described.

In an operation 1505, a camera 108 or an HMD 102 that includes a camera, is positioned to be capable of viewing the game controller 420. The game controller 420 includes light sources C, L and R and optionally, light source P. The light sources L and R are disposed on the extension portion 512 of the game controller and are visible from both inside surfaces and outside surfaces of the extension portion. The HMD 102 or computer 106 in communications with the HMD and/or the camera 108 is familiar with the game controller 420 and the respective distances and angles separating the light sources C, L, R and optional light source P. The respective distances and angles separating the light sources C, L, R and optional light source P can be obtained manually by manually entering the data or through a calibration process or electronically communicated from the game controller 420 to the by the HMD 102 or computer 106.

In an operation 1510, the light sources C, L and R are illuminated to emit light from both the outside surfaces 514LB and 514RB and the inside surfaces 514LA and 514RA of the extension portion 512. The camera 108 and/or the HMD 102 capture an image of the illuminated light sources C, L and R and the optional light source P, in an operation 1515.

In an operation 1520, a roll angle τ of the game controller around the centerline CL of the game controller 420 is determined from the captured image of the illuminated light sources C, L and R and optional light source P as described above in FIGS. 13A-D.

In an operation 1525, a yaw angle θ around the center point CP of the game controller 420 is determined from the captured image of the illuminated light sources C, L and R and optional light source P as described above in FIGS. 13E-H.

In an operation 1530, a pitch angle β of the game controller relative to an origin O of reference plane XY is determined from the captured image of the illuminated light sources C, L and R and optional light source P as described above in FIGS. 14A-L.

In an operation 1535, a separation distance SD between the camera 108 and the game controller 420 is determined from the captured image of the illuminated light sources C, L and R and optional light source P as described above in FIGS. 13A-D.

In an operation 1540, the roll angle τ, yaw angle θ, pitch angle β, and separation distance SD are used by the computer 106 to identify the position, location, orientation and movement of the game controller 420. The determined the position, location, orientation and movement of the game controller 420 information is fed into the game application being executed on the computer 106 to adjust at least one aspect of the game application, in an operation 1545.

In one implementation, adjusting at least one aspect of the game application can also include receiving a second signal from a second source identifying the position, location, orientation and movement of the game controller 420. The second source can include the inertial sensors 515 disposed in the game controller 420. Alternatively, the second source can be a second camera performing a similar analysis of the roll angle τ, yaw angle θ, pitch angle β, and separation distance SD of the game controller 420. For example, the second camera can be disposed in the HMD 102 or a second HMD worn by another user in the same room as the game controller 420.

The method operations can continue though operations 1510-1545 substantially continuously, as long as the game controller 420 is moving in an operation 1550. The method operations 1510-1545 can be repeated many times per second. By way of example, the method operations 1510-1545 can be repeated as often as about 100,000 times per second (100 kHz) or even more into the many millions of times per second (1-10 MHz), as may be required if the game controller 420 is being moved very quickly. Alternatively, if the game controller 420 is being moved relatively seldom or being moved very slowly, then the method operations 1510-1545 can be repeated as few as between about 1 to about 100 times per second or only after the inertial devices 515 or some other input provides an input to the computer 106 that the game controller is moving. When the game controller 420 is no longer moving the method operations can end.

Figure 16:
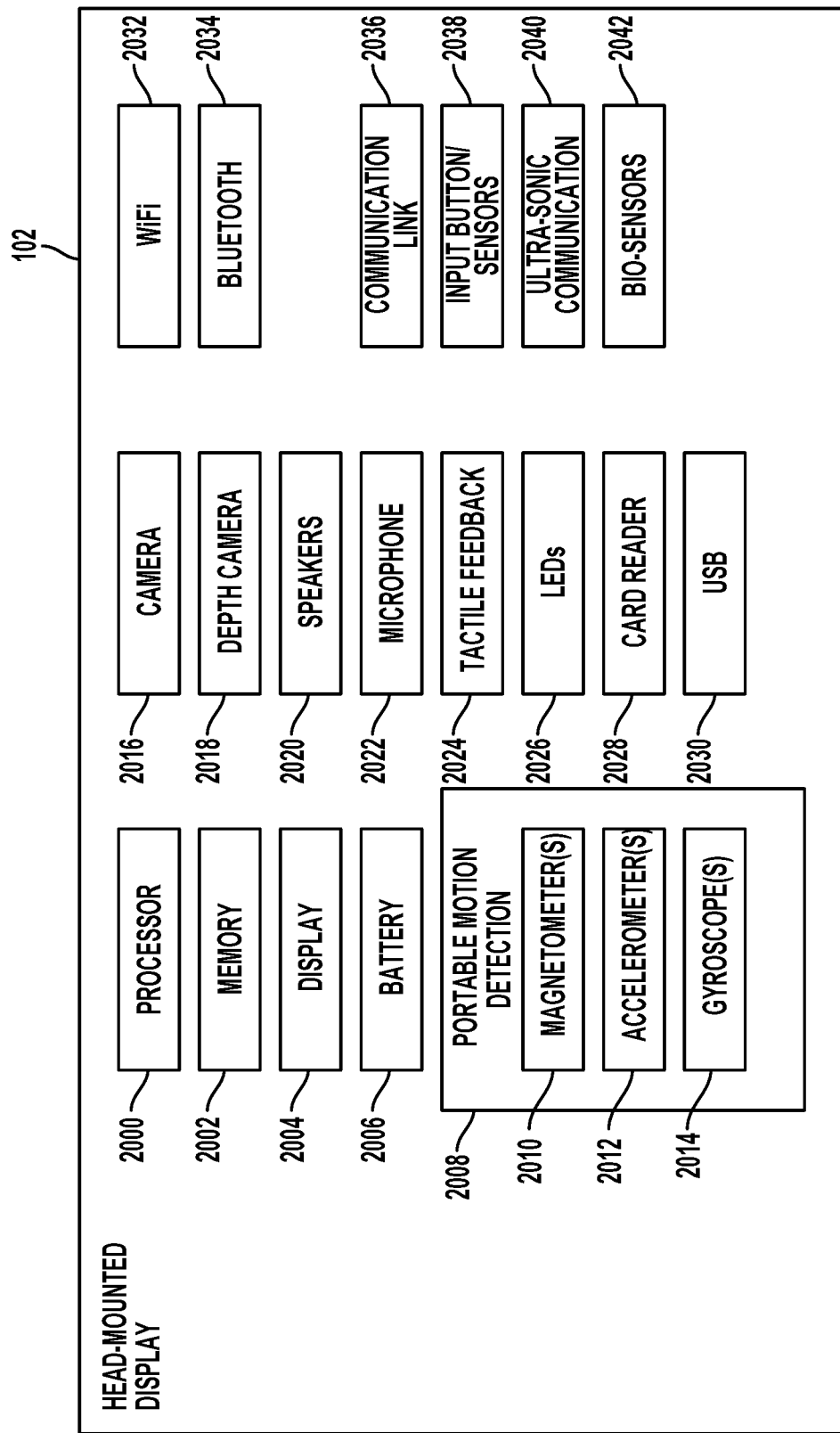
FIG. 16 is a diagram is shown illustrating example components of a head-mounted display, in accordance with the disclosed embodiments.

FIG. 16 is a diagram is shown illustrating example components of a head-mounted display 102, in accordance with the disclosed embodiments. It should be understood that more or less components may be included or excluded from the HMD 102, depending on the configuration and functions enabled. The head-mounted display 102 may include a processor 2000 for executing program instructions. A memory 2002 is provided for storage purposes, and may include both volatile and non-volatile memory. A display 2004 is included which provides a visual interface that a user may view.

The display 2004 may be defined by one single display, or in the form of a separate display screen for each eye. When two display screens are provided, it is possible to provide left-eye and right-eye video content separately. Separate presentation of video content to each eye, for example, may provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, may be the left-eye video feed, but in other embodiments it may be the right-eye video feed.

A battery 2006 may be provided as a power source for the head-mounted display 102. In other embodiments, the power source may include an outlet connection to power. In other embodiments, an outlet connection to power and a battery 2006 may be provided. A motion detection module 2008 may include any of various kinds of motion sensitive hardware, such as a magnetometer 2010, an accelerometer 2012, and a gyroscope 2014.

An accelerometer 2012 is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 2012 are used to provide the direction of gravity, which gives an absolute reference for two angles (world-space yaw and world-space roll).

A magnetometer 2010 measures the strength and direction of the magnetic field in the vicinity of the head-mounted display. In one embodiment, three magnetometers 2010 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp may be calibrated using information from other sensors such as the gyroscope or the camera. In one embodiment, accelerometer 2012 is used together with magnetometer 2010 to obtain the inclination and azimuth of the head-mounted display 102.

A gyroscope 2014 is a device for measuring or maintaining position and pose, based on the principles of angular momentum. In one embodiment, three gyroscopes 2014 provide information about movement across the respective axis (x, y and z) based on inertial sensing. The gyroscopes help in detecting fast rotations. However, the gyroscopes may drift overtime without the existence of an absolute reference. This requires resetting the gyroscopes periodically, which may be done using other available information, such as position and pose determination based on visual tracking of an object, accelerometer, magnetometer, etc.

A camera 2016 is provided for capturing images and image streams of a real environment. More than one camera (optionally) may be included in the HMD 102, including a camera that is rear-facing (directed away from a user when the user is viewing the display of the HMD 102), and a camera that is front-facing (directed towards the user when the user is viewing the display of the HMD 102). Additionally, a depth camera 2018 may be included in the HMD 102 for sensing depth information of objects in a real environment.

The HMD 102 includes speakers 2020 for providing audio output. Also, a microphone 2022 may be included for capturing audio from the real environment, including sounds from the ambient environment, speech made by the user, etc. The HMD 102 includes tactile feedback module 2024 for providing tactile feedback to the user. In one embodiment, the tactile feedback module 2024 is capable of causing movement and/or vibration of the HMD 102 so as to provide tactile feedback to the user.

LEDs 2026 are provided as visual indicators of statuses of the head-mounted display 102. For example, an LED may indicate battery level, power on, etc. A card reader 2028 is provided to enable the head-mounted display 102 to read and write information to and from a memory card. A USB interface 2030 is included as one example of an interface for enabling connection of handheld peripheral devices, or connection to other devices, such as other portable devices, computers, etc. In various embodiments of the HMD 102, any of various kinds of interfaces may be included to enable greater connectivity of the HMD 102.

A WiFi module 2032 may be included for enabling connection to the Internet via wireless networking technologies. Also, the HMD 102 may include a Bluetooth module 2034 for enabling wireless connection to other devices. A communications link 2036 may also be included for connection to other devices. In one embodiment, the communications link 2036 utilizes infrared transmission for wireless communication. In other embodiments, the communications link 2036 may utilize any of various wireless or wired transmission protocols for communication with other devices.

Input buttons/sensors 2038 are included to provide an input interface for the user. Any of various kinds of input interfaces may be included, such as buttons, gestures, touchpad, joystick, trackball, etc. An ultra-sonic communication module 2040 may be included in HMD 102 for facilitating communication with other devices via ultra-sonic technologies.

Bio-sensors 2042 are included to enable detection of physiological data from a user. In one embodiment, the bio-sensors 2042 include one or more dry electrodes for detecting bio-electric signals of the user through the user's skin, voice detection, eye retina detection to identify users/profiles, etc.

The foregoing components of HMD 102 have been described as merely exemplary components that may be included in HMD 102. In various embodiments of the disclosure, the HMD 102 may or may not include some of the various aforementioned components. Embodiments of the HMD 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous users (e.g., P1, P2, . . . Pn). Each of these users may receive or share a video stream, or a single video stream may include regions of a frame generated specifically for each player, e.g., generated based on each user's point of view. Any number of clients may be local (e.g., co-located) or are geographically dispersed. The number of clients included in a game system may vary widely from one or two to thousands, tens of thousands, or more. As used herein, the term "game player" or "user" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD may be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content may be rendered so long as it may be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a vision recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic may produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client may be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 17:
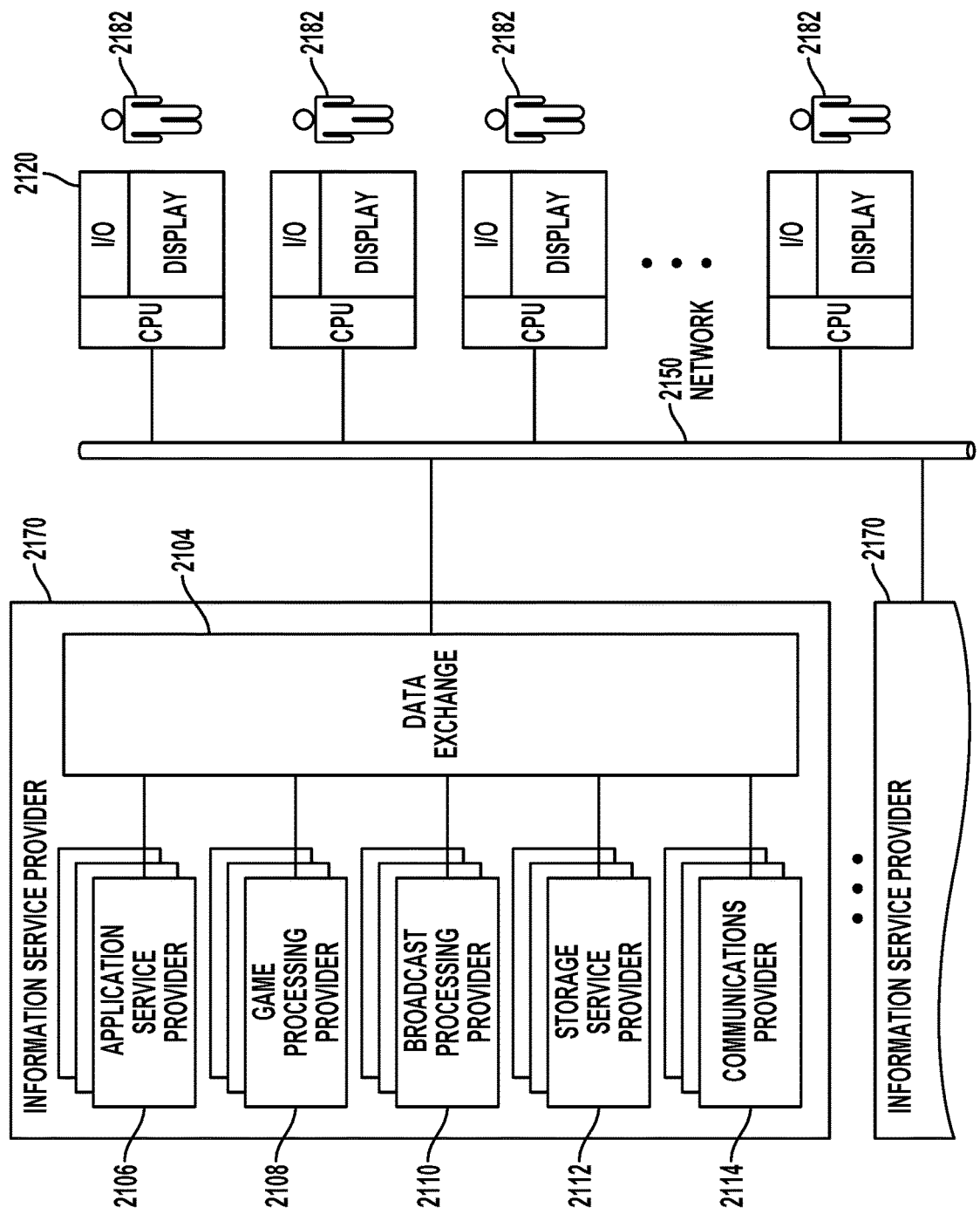
FIG. 17 illustrates an embodiment of an Information Service Provider architecture.

FIG. 17 illustrates an embodiment of an Information Service Provider architecture. Information Service Providers (ISP) 2170 delivers a multitude of information services to users 2182 geographically dispersed and connected via network 2150. An ISP may deliver just one type of service, such as stock price updates, or a variety of services such as broadcast media, news, sports, gaming, etc. Additionally, the services offered by each ISP are dynamic, that is, services may be added or taken away at any point in time. Thus, the ISP providing a particular type of service to a particular individual may change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 2170 includes Application Service Provider (ASP) 2106, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing may be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 2170 includes a Game Processing Server (GPS) 2108 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2110 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content may reach almost any country in the world.

Storage Service Provider (SSP) 2112 provides computer storage space and related management services. SSPs also offer periodic backup and archiving. By offering storage as a service, users may order more storage as required. Another major advantage is that SSPs include backup services and users will not lose all their data if their computers' hard drives fail. Further, a plurality of SSPs may have total or partial copies of the user data, allowing users to access data in an efficient way independently of where the user is located or the device being used to access the data. For example, a user may access personal files in the home computer, as well as in a mobile phone while the user is on the move.

Communications Provider 2114 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider may also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 2104 interconnects the several modules inside ISP 2170 and connects these modules to users 2182 via network 2150. Data Exchange 2104 may cover a small area where all the modules of ISP 2170 are in close proximity, or may cover a large geographic area when the different modules are geographically dispersed. For example, Data Exchange 2104 may include a fast Gigabit Ethernet (or faster) within a cabinet of a data center, or an intercontinental virtual area network (VLAN).

Users 2182 access the remote services with client device 2120, which includes at least a CPU, a display and I/O. The client device may be a PC, a mobile phone, a netbook, tablet, gaming system, a PDA, etc. In one embodiment, ISP 2170 recognizes the type of device used by the client and adjusts the communication method employed. In other cases, client devices use a standard communications method, such as html, to access ISP 2170.

Embodiments of the present disclosure may be practiced with various computer system configurations including hand-held devices, microprocessor systems, microprocessor-based or programmable consumer electronics, minicomputers, mainframe computers and the like. The disclosure may also be practiced in distributed computing environments where tasks are performed by remote processing devices that are linked through a wire-based or wireless network.

With the above embodiments in mind, it should be understood that the disclosure may employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The disclosure may also be embodied as computer readable code on a computer readable medium. The computer readable medium is any data storage device that may store data, which may be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium may include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A controller for use in interfacing with a virtual reality system, comprising,
    a body including a proximate end and a distal end, the distal end being opposite from the proximate end;
    a handgrip portion of the body disposed at the proximate end of the body;
    an extension portion of the body coupled at the distal end of the body, the extension portion having a loop shape; and
    a plurality of lights disposed on surfaces of the extension portion, such that lights illuminate on an inside of the loop shape and on an outside of the loop shape.

2. The controller of claim 1, wherein a plurality of buttons are integrated with the body between the handgrip portion and the extension portion.

3. The controller of claim 1, further comprising,
    an inertial sensor disposed in the body, the inertial sensor configured for detecting motion of the controller.

4. The controller of claim 1, wherein each of the plurality of lights is illuminate using one or more light emitting diodes disposed in the extension portion.

5. The controller of claim 1, wherein a joystick is integrated in the body near the distal end, the joystick is configured to be reached by a thumb of a user's hand when using the controller.

6. The controller of claim 1, wherein a button and a joystick is integrated with the body near the distal end, the button and the joystick are configured to be reached and interfaced with by a finger of a user's hand when the user's hand is holding the controller by the handgrip.

7. The controller of claim 1, further comprising,
    a communications module for exchanging data with a computing device, the data includes motion data detected by an inertial sensor disposed in the body of the controller.

8. The controller of claim 1, wherein the plurality of lights are configured to be detected by a camera, the camera producing image data that is analyzed to determine changes in position of controller in 3D space, the changes in position of the controller being used to determine an input or inputs provided to an application.

9. The controller of claim 8, wherein the application is configured to produce virtual reality content that is provided to a head mounted display, and said input or inputs are configured to enable interactivity with the virtual reality content when the application is executed by a computing device for interfacing with the head mounted display.

10. The controller of claim 1, wherein the plurality of lights disposed on surfaces of the extension portion enable tracking of the controller by a camera that produces image data, the image data being analyzed to track one or more of the plurality of lights for detecting position, movement or orientation of the controller.

11. The controller of claim 10, further comprising,
    an inertial sensor disposed in the body of the controller, the inertial sensor is configured to produce motion data used to additionally track the controller.

12. The controller of claim 1, further comprising,
    an inertial sensor disposed in the body of the controller;
    a plurality of buttons located proximate to the handgrip;
    a communications circuit disposed in the body of the controller and in communication with the inertial sensor and the plurality of buttons.

13. The controller of claim 12, wherein the communication circuit is configured to communicate with a computer to provide the computer with data regarding movement from the inertial sensor and presses of one or more of said plurality of buttons.

14. The controller of claim 13, wherein the computer is coupled to a camera that is configured to capture the plurality of lights of the controller, the computer is further configured to provide virtual reality content to a head mounted display and use data from the controller to interact with the virtual reality content.

15. A controller for use in interfacing with a virtual reality system, comprising,
    a body of the controller, including,
        a handle portion of the body;
        an extension portion extending from a top end of the handle, the extension portion having a loop shape; and a plurality of lights disposed on surfaces of the extension portion, such that lights illuminate on an inside of the loop shape and on an outside of the loop shape.

16. The controller of claim 15, further comprising,
an inertial sensor disposed in the body of the controller;
a plurality of buttons located proximate to the handle;
a communications circuit disposed in the body of the controller and in communication with the inertial sensor and the plurality of buttons.

17. The controller of claim 16, wherein the communication circuit is configured to communicate with a computer to provide the computer with data regarding movement from the inertial sensor and presses of one or more of said plurality of buttons.

18. The controller of claim 17, wherein the computer is coupled to a camera that is configured to capture one or more of the plurality of lights of the controller, the computer is further configured to provide virtual reality content to a head mounted display and use data from the controller to interact with the virtual reality content.

19. The controller of claim 15, wherein a button and a joystick is integrated with the body, the button and the joystick are configured to be reached and interfaced with by a finger of a user's hand when the user's hand is holding the controller by the handle.

20. The controller of claim 15, wherein one or more of the plurality of lights are configured to be detected by a camera, the camera producing image data that is configured to be analyzed to determine changes in position of controller in 3D space, the changes in position of the controller being used to determine an input or inputs provided to an application executed to render a virtual reality scene on a head mounted display.

* * * * *